US012720542B2

(12) United States Patent
Wong

(10) Patent No.: US 12,720,542 B2
(45) Date of Patent: Aug. 25, 2026

(54) METHODS, COMMUNICATIONS DEVICES, AND INFRASTRUCTURE EQUIPMENT

(71) Applicant: Sony Group Corporation, Tokyo (JP)

(72) Inventor: Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 329 days.

(21) Appl. No.: 18/283,532

(22) PCT Filed: Mar. 18, 2022

(86) PCT No.: PCT/EP2022/057141
§ 371 (c)(1),
(2) Date: Sep. 22, 2023

(87) PCT Pub. No.: WO2022/207362
PCT Pub. Date: Oct. 6, 2022

(65) Prior Publication Data

US 2024/0172231 A1 May 23, 2024

(30) Foreign Application Priority Data

Mar. 29, 2021 (EP) .................................... 21165723

(51) Int. Cl.
*H04W 72/12* (2023.01)
*H04L 5/00* (2006.01)
(Continued)

(52) U.S. Cl.
CPC ....... *H04W 72/1273* (2013.01); *H04L 5/0053* (2013.01); *H04W 72/232* (2023.01); *H04W 76/20* (2018.02); *H04W 92/10* (2013.01)

(58) Field of Classification Search
CPC ..... H04W 72/12; H04W 72/23; H04W 76/20; H04W 92/10; H04W 72/02; H04W 72/04;
(Continued)

(56) References Cited

U.S. PATENT DOCUMENTS 8,634,333 B2 * 1/2014 Sarkar ....................... H04L 1/18 370/278
8,917,603 B2 * 12/2014 Yang ....................... H04L 5/001 370/278
(Continued)

FOREIGN PATENT DOCUMENTS

WO 2018/113589 A1 6/2018
WO 2022/073877 A1 4/2022

OTHER PUBLICATIONS

International Search Report and Written Opinion mailed on Jun. 7, 2022, received for PCT Application PCT/EP2022/057141, filed on Mar. 18, 2022, 9 pages including English Translation.
(Continued)

*Primary Examiner* — Man U Phan
(74) *Attorney, Agent, or Firm* — XSENSUS LLP

(57) ABSTRACT

Receiving, from a wireless network, signals on one or more downlink channels, each of the downlink channels being within one of a plurality of downlink transmission occasions, determining, for each of the downlink transmission occasions, a value of an acknowledgement bit indicating whether or not one of the signals has been successfully received on one of the downlink channels within that downlink transmission occasion, performing, based on at least one bundling characteristic, one or more of a plurality of different bundling operations on the acknowledgement bits determined for each of the downlink transmission occasions to produce one or more bundled bits, and transmitting, to the wireless communications network, an indication of the one or more bundled bits.

17 Claims, 17 Drawing Sheets

(51) Int. Cl.

| | |
|---|---|
| ***H04W 72/1273*** | (2023.01) |
| ***H04W 72/232*** | (2023.01) |
| ***H04W 76/20*** | (2018.01) |
| *H04W 92/10* | (2009.01) |

(58) Field of Classification Search

CPC ..... H04W 72/08; H04W 72/10; H04W 72/11; H04W 72/14; H04W 72/20; H04W 72/21; H04W 72/54; H04W 72/56; H04W 74/08; H04L 5/00; H04L 1/16; H04L 1/18; H04L 1/00; H04L 12/24; H04L 25/03; H04L 41/08

USPC .......................................................... 370/329

See application file for complete search history.

(56) References Cited

U.S. PATENT DOCUMENTS

| | | | | |
|---|---|---|---|---|
| 8,942,080 | B2 * | 1/2015 | Shen | H04L 1/1692<br>370/208 |
| 9,112,689 | B2 * | 8/2015 | Papasakellariou | H04L 1/1628 |
| 9,118,474 | B2 * | 8/2015 | Yin | H04L 5/001 |
| 9,577,803 | B2 * | 2/2017 | Yan | H04L 5/0046 |
| 9,628,223 | B2 * | 4/2017 | Sarkar | H04L 1/1621 |
| 10,492,181 | B2 * | 11/2019 | Jiang | H04W 72/121 |
| 12,184,430 | B2 * | 12/2024 | Lei | H04L 1/1822 |
| 12,261,700 | B2 * | 3/2025 | Lei | H04W 72/23 |
| 12,335,949 | B2 * | 6/2025 | Yang | H04L 5/0053 |
| 2014/0219265 | A1 | 8/2014 | Sarkar | |
| 2017/0331594 | A1 * | 11/2017 | Wen | H04L 1/1854 |
| 2020/0186299 | A1 * | 6/2020 | Lunttila | H04L 1/1854 |

OTHER PUBLICATIONS

Nokia et al., "Revised WID: Enhanced Industrial Internet of Things (IoT) and ultra-reliable and low latency communication (URLLC) support for NR", 3GPP TSG RAN Meeting #88e, RP-201310, Jun. 29-Jul. 3, 2020, 6 pages.

Moderator (Nokia), "Moderator summary #2 on HARQ-ACK feedback enhancements for NR Rel-17 URLLC/IIoT", 3GPP TSG-RAN WG1 Meeting #104-e, R1-2101818, Jan. 25-Feb. 5, 2021, pp. 1-174.

Holma et al., "LTE for Umts Ofdma and SC-FDMA Based Radio Access", John Wiley & Sons, 2009, 450 pages.

Intel Corporation, "Discussion on prioritized UE HARQ feedback enhancements for URLLC/IIoT", 3GPP TSG RAN WG1 #103-e, R1-2008984, Oct. 26-Nov. 13, 2020, 6 pages.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

3GPP, "Study on Scenarios and Requirements for Next Generation Access Technologies; (Release 14)", 3GPP TR 38.913 V14.3.0, Jun. 2017, pp. 1-39.

* cited by examiner

METHODS, COMMUNICATIONS DEVICES, AND INFRASTRUCTURE EQUIPMENT

CROSS-REFERENCE TO RELATED APPLICATIONS

The present application is based on PCT filing PCT/EP2022/057141, filed Mar. 18, 2022, which claims priority to European Patent Application No. 21165723.4, filed Mar. 29, 2021, the contents of each are hereby incorporated by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever-increasing range of devices associated with a wider range of data traffic profiles and types than existing systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device configured to transmit signals to and/or to receive signals from a wireless communications network via a wireless radio interface provided by the wireless communications network. The method comprises receiving, from the wireless communications network, signals on one or more downlink channels, each of the downlink channels being within one of a plurality of downlink transmission occasions, determining, for each of the downlink transmission occasions, a value of an acknowledgement bit indicating whether or not one of the signals has been successfully received by the communications device on one of the downlink channels within that downlink transmission occasion, performing, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, and transmitting, to the wireless communications network, an indication of the one or more bundled bits.

Embodiments of the present technique, which, in addition to methods of operating communications devices and methods of operating infrastructure equipment, relate to communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
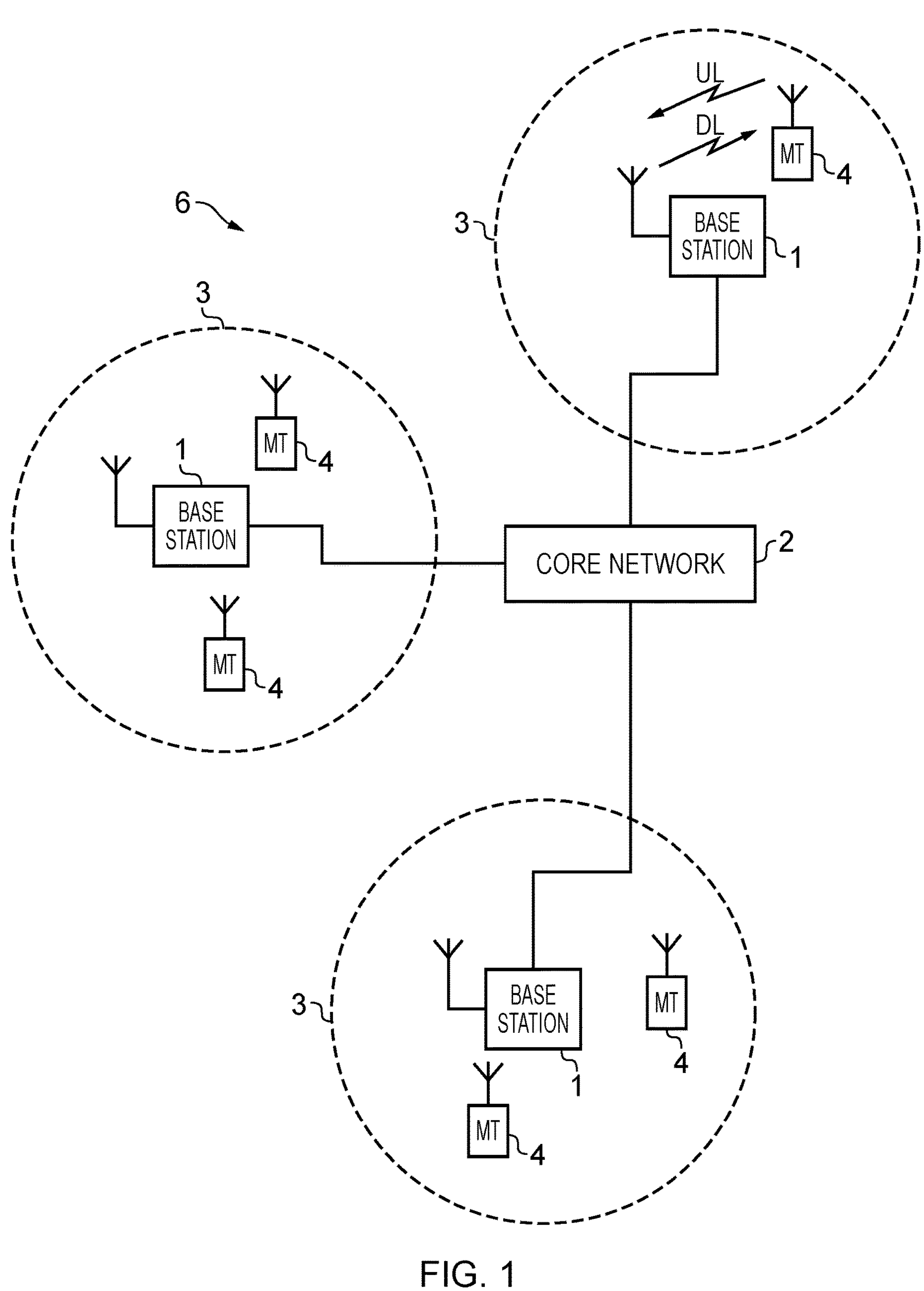
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
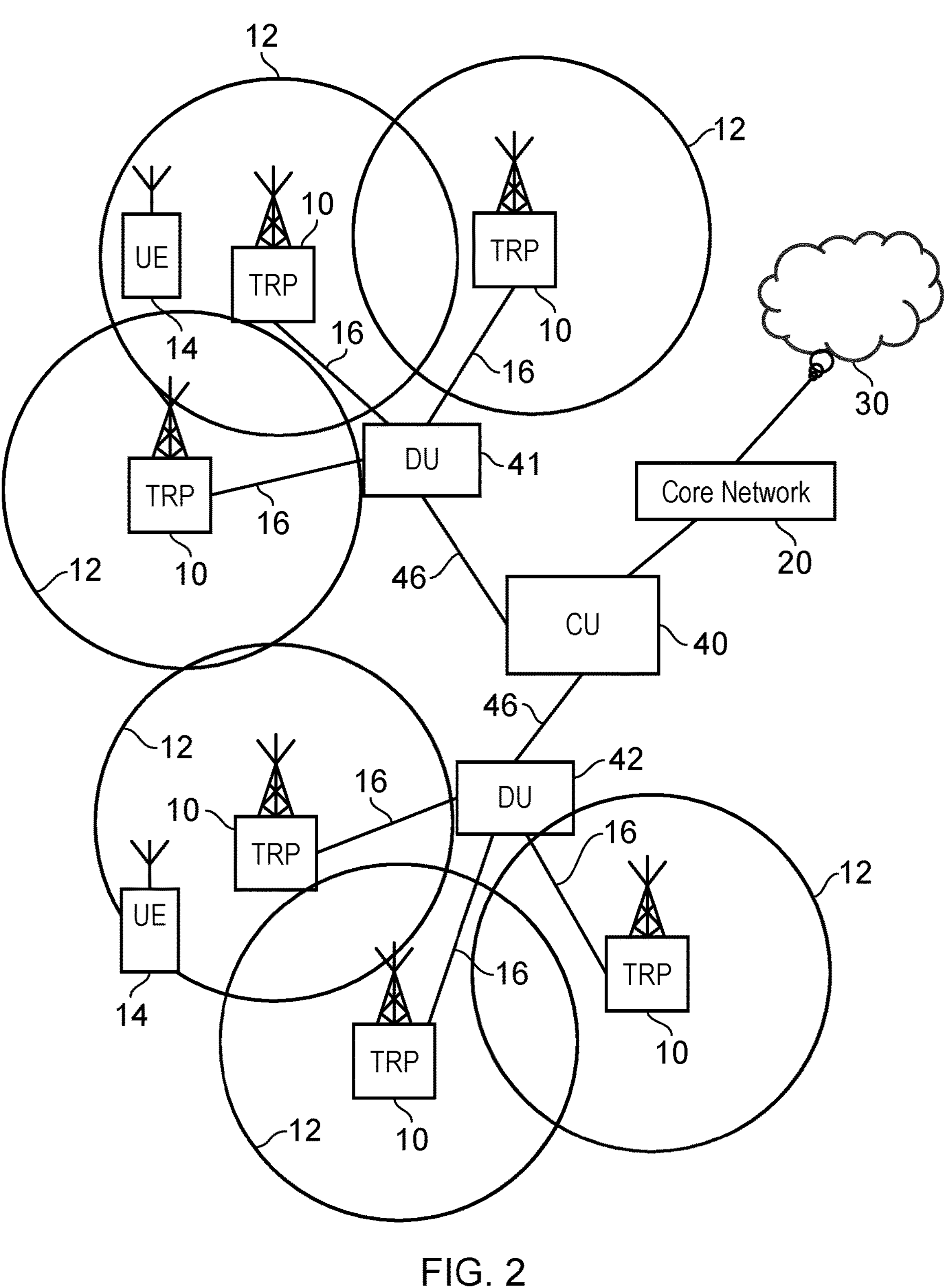
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems.

Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
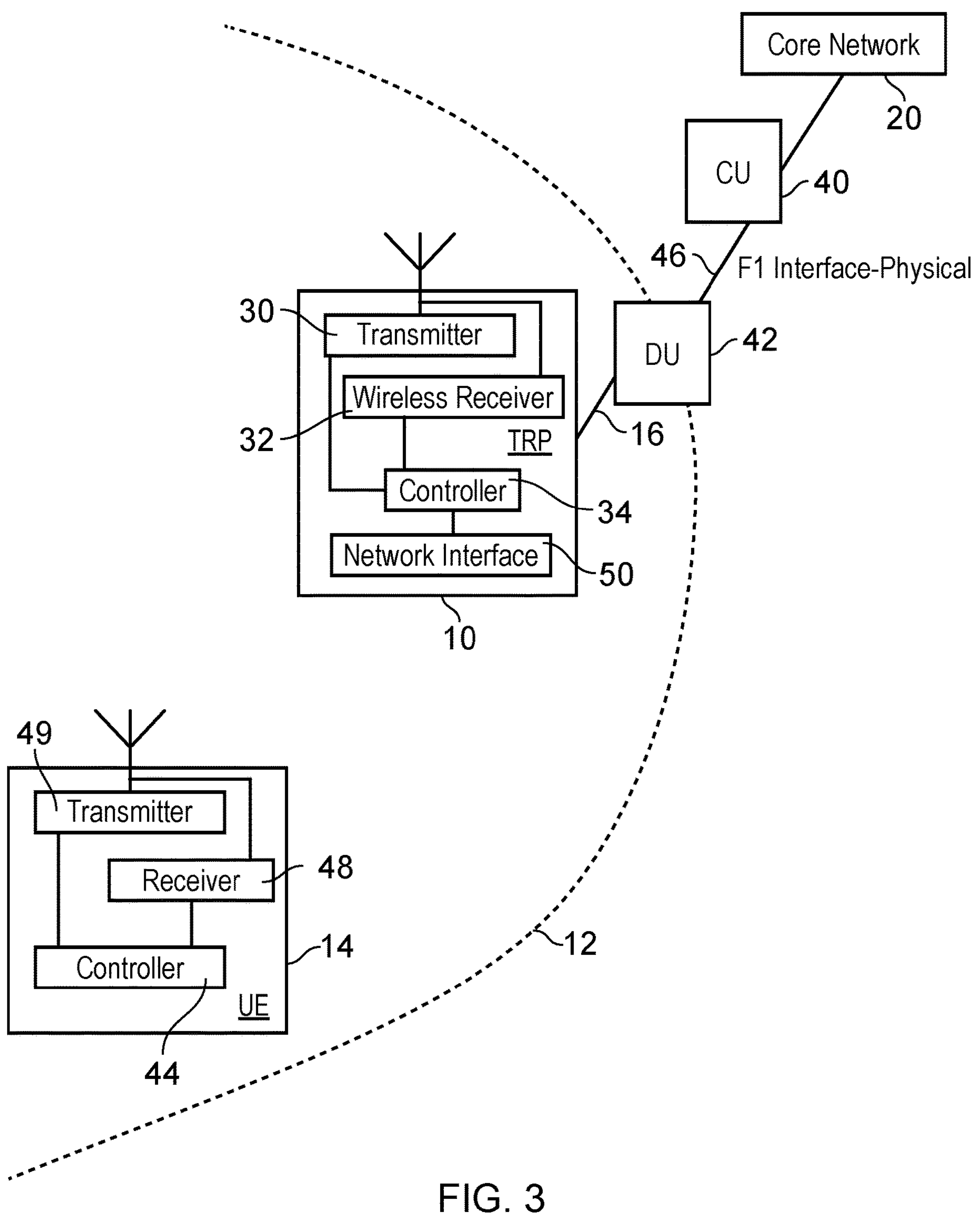
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

eURLLC and eMBB

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable and Low Latency Communications (URLLC) services are for one transmission of a 32 byte packet to be transmitted from the radio protocol layer 2/3 SDU ingress point to the radio protocol layer 2/3 SDU egress point of the radio interface within 1 ms with a reliability of $1\text{-}10^{-5}$ (99.999%) or higher (99.9999%) [2].

Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] specifies features that require high reliability and low latency, such as factory automation, transport industry, electrical power distribution, etc. in a 5G system. eURLLC is further enhanced as IIoT-URLLC [4], for which one of the objectives is to enhance UE feedback for Hybrid Automatic Repeat Request Acknowledgements (HARQ-ACK) for Physical Downlink Shared Channel (PDSCH) transmissions.

PDSCH HARQ-ACK Feedback

In a Dynamic Grant PDSCH (DG-PDSCH), the PDSCH resource is dynamically indicated by the gNB using a DL Grant carried by Downlink Control Information (DCI) in a Physical Downlink Control Channel (PDCCH).

A PDSCH is transmitted using HARQ transmission, where for a PDSCH ending in slot n, the corresponding Physical Uplink Control Channel (PUCCH) carrying the HARQ-ACK is transmitted in slot $n+K_1$. Here, in Dynamic Grant PDSCH, the value of $K_1$ is indicated in the field "PDSCH-to-HARQ_feedback timing indicator" of the DL Grant (carried by DCI Format 1_0, DCI Format 1_1 or DCI Format 1_2). Multiple (different) PDSCHs can point to the same slot for transmission of their respective HARQ-ACKs, and these HARQ-ACKs (in the same slot) are multiplexed into a single PUCCH. Hence, a PUCCH can contain multiple HARQ-ACKs for multiple PDSCHs.

Figure 4:
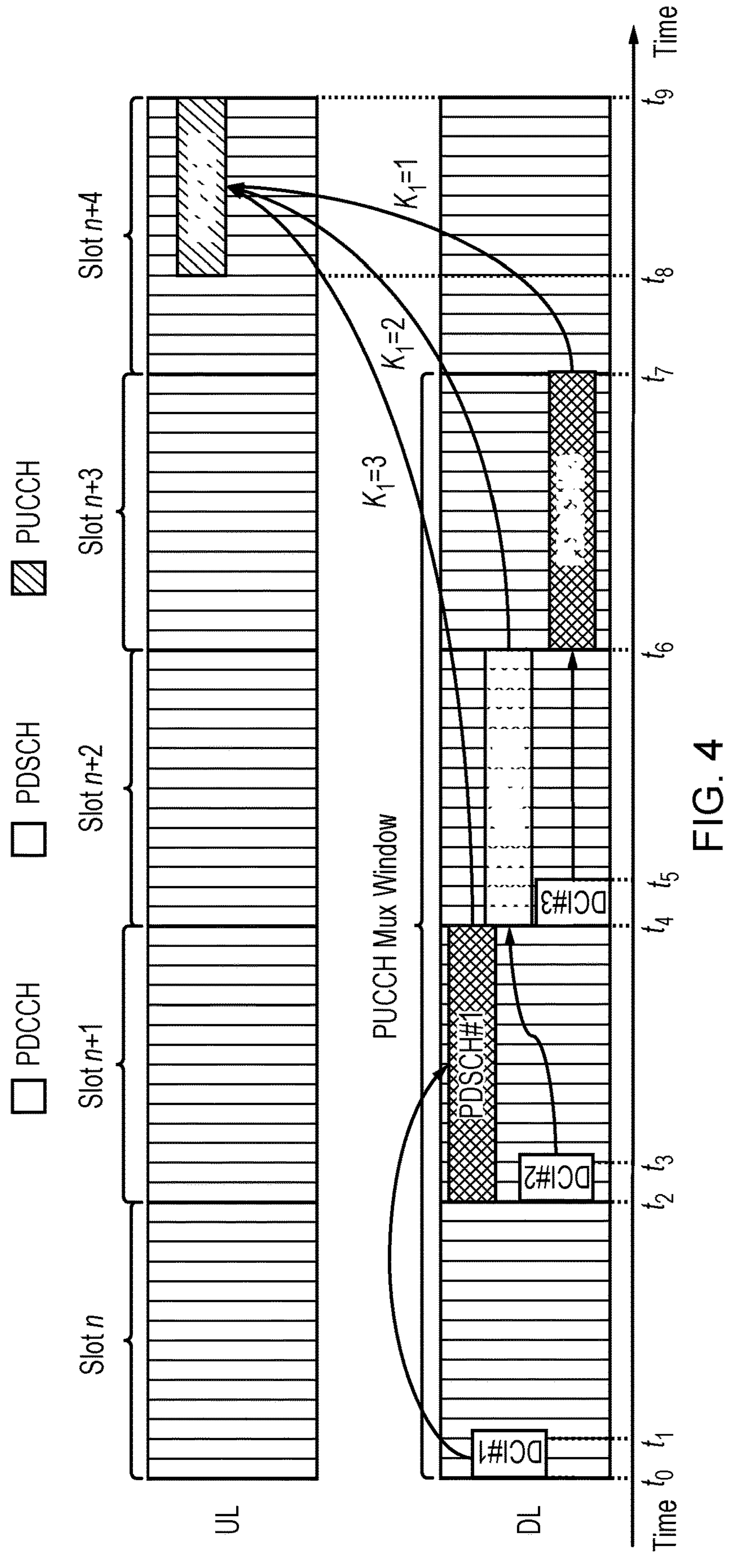
FIG. 4 illustrates how multiple Hybrid Automatic Repeat Request Acknowledgement (HARQ-ACK) feedback indications may be multiplexed onto a single Physical Uplink Control Channel (PUCCH)

An example of this is shown in FIG. 4, where three DL Grants are transmitted to the UE via DCI #1, DCI #2 and DCI #3 in slot n, n+1 and n+2 respectively. DCI #1, DCI #2 and DCI #3 schedule PDSCH #1, PDSCH #2 and PDSCH #3 respectively. DCI #1, DCI #2 and DCI #3 further indicate $K_1=3$, $K_1=2$ and $K_1=1$ respectively. Since the $K_1$ values indicate that the HARQ-ACK feedback for PDSCH #1, PDSCH #2 and PDSCH #3 are all to be transmitted in slot n+4, the UE multiplexes all of these HARQ-ACKs into a single PUCCH, i.e. PUCCH #1. The PUCCH Multiplexing Window is a time window where PDSCHs can be multiplexed into that single PUCCH, and the size of the PUCCH multiplexing window depends on the range of $K_1$ values. In the example in FIG. 4, the PUCCH Multiplexing Window is from Slot n to Slot n+3 (i.e. between time $t_0$ and time $t_7$), which means the max $K_1$ value is 4 slots.

In Rel-15, only one PUCCH per slot is allowed to carry HARQ-ACKs for the same UE, even if the different PUCCHs do not overlap in time. The PUCCH resource is indicated in the "PUCCH Resource Indicator" (PRI) field in the DL Grant. Each DL Grant may indicate a different PUCCH resource, but the UE will follow the PRI indicated in the last PDSCH in the PUCCH Multiplexing Window since the UE only knows the total number of HARQ-ACK bits after the last PDSCH is received.

Figure 5:
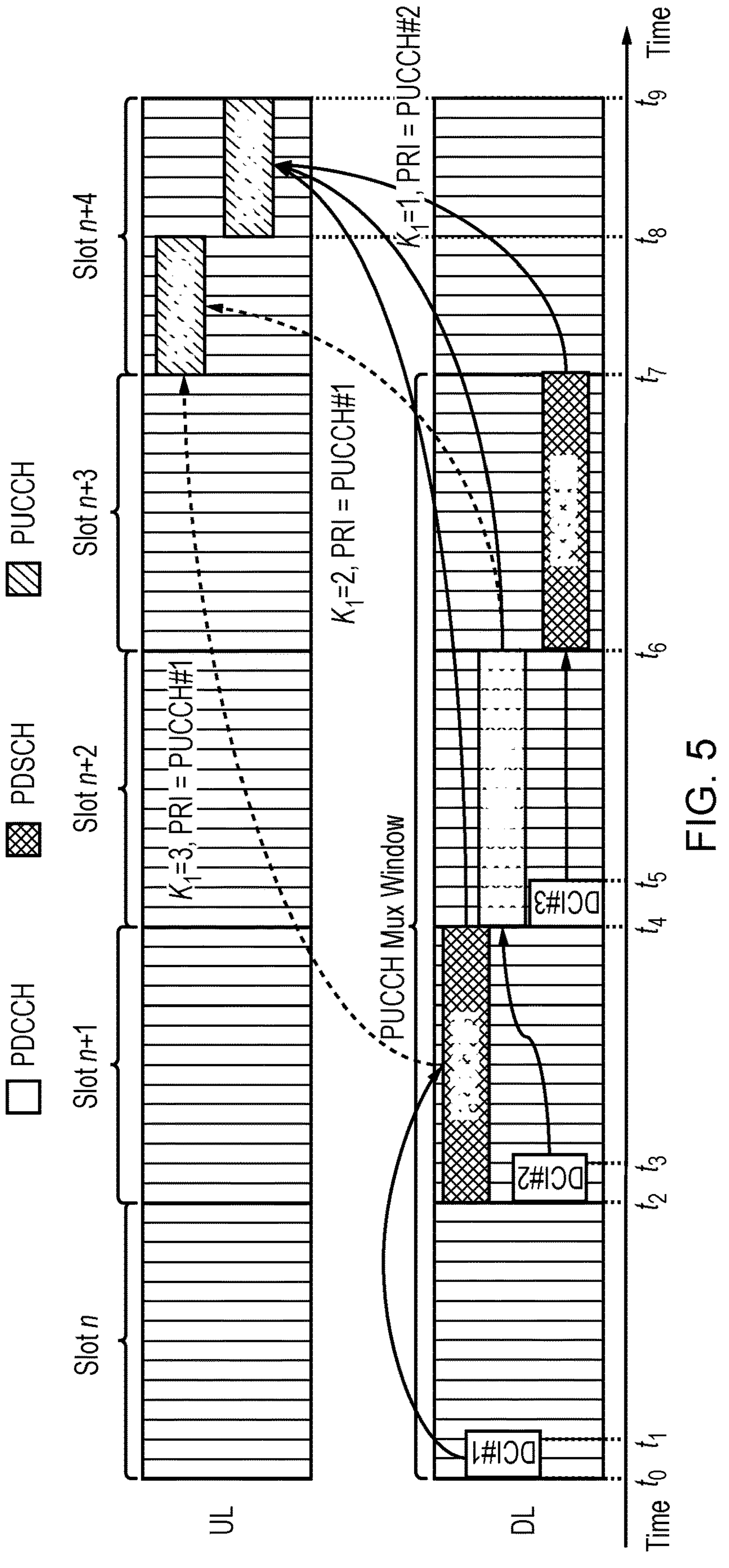
FIG. 5 illustrates how a PUCCH Resource Indicator may be used to indicate onto which PUCCH HARQ-ACK feedback indications may be multiplexed.

An example of this is shown in FIG. 5, where DCI #1 and DCI #2 indicate PUCCH #1 for the HARQ-ACKs corresponding to PDSCH #1 and PDSCH #2, but DCI #3 indicates PUCCH #2 for the HARQ-ACK corresponding to PDSCH #3. Here, PUCCH #1 and PUCCH #2 do not overlap in time. Since DCI #3 schedules the last PDSCH, i.e. PDSCH #3, in the Multiplexing Window, the UE will use PUCCH #2 to carry the HARQ-ACKs for PDSCH #1, PDSCH #2 and PDSCH #3. It should be noted here that a PUCCH carrying other UCI such as SR (Scheduling Request) can be transmitted separately to a PUCCH carrying HARQ-ACKs within the same slot if they do not overlap in time.

In Rel-16 eURLLC, sub-slot PUCCH is introduced for carrying HARQ-ACKs for URLLC PDSCHs. Sub-slot based PUCCHs allow more than one PUCCH carrying HARQ-ACKs to be transmitted within a slot. This gives more opportunity for PUCCHs carrying HARQ-ACKs for PDSCHs to be transmitted within a slot, thereby reducing latency for HARQ-ACK feedback. In a sub-slot based PUCCH, the granularity of the $K_1$ parameter (i.e. the time difference between the end of a PDSCH and the start of its corresponding PUCCH) is in units of sub-slots instead of units of slots, where the sub-slot size can be either two symbols or seven symbols.

Figure 6:
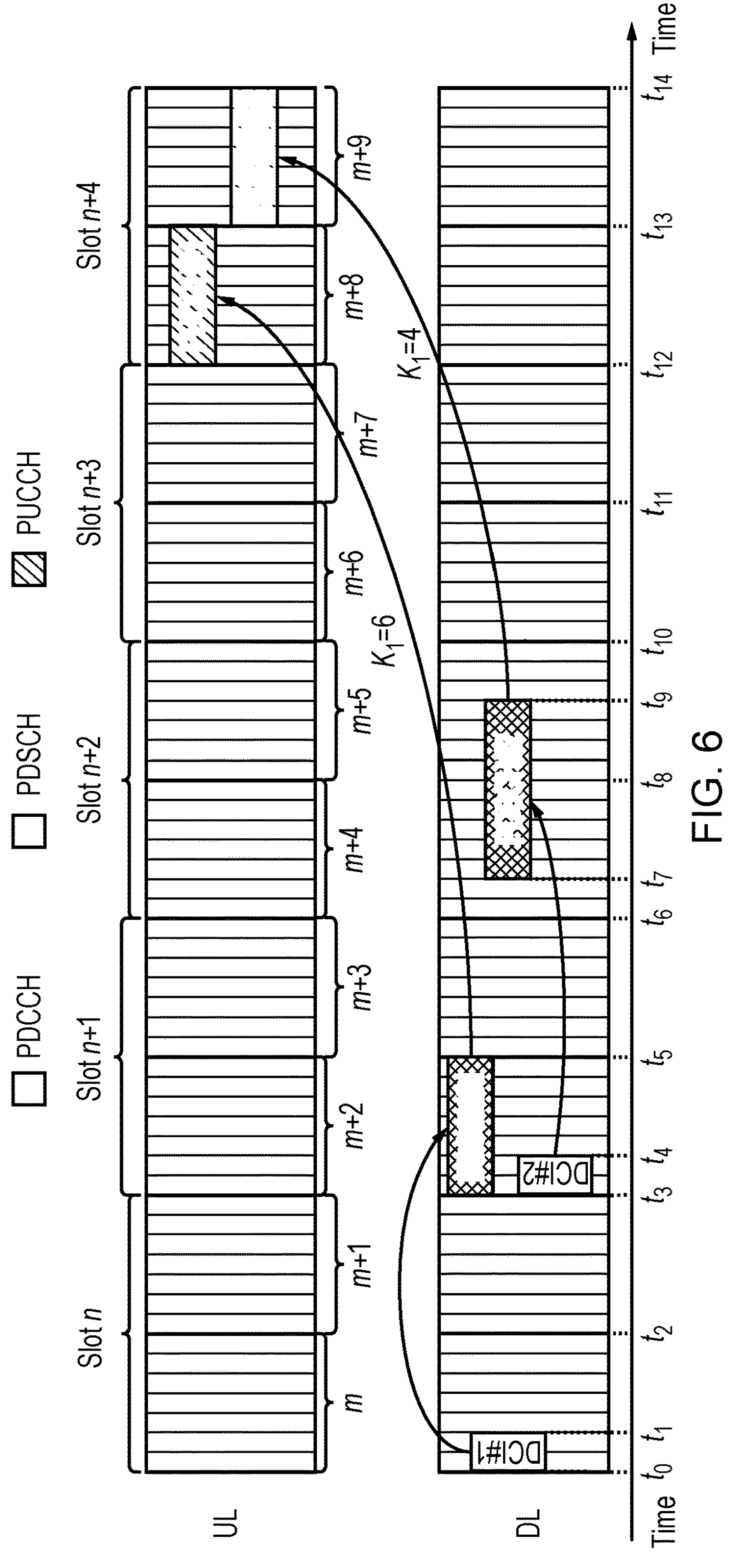
FIG. 6 shows an example of sub-slot based PUCCHs.

An example of this is shown in FIG. 6, where the sub-slot size equals seven symbols (i.e. half a slot) and the sub-slots are labelled as m, m+1, m+2, etc. PDSCH #1 is transmitted in slot n+1 but for sub-slot based HARQ-ACK PUCCH, it is considered to be transmitted in sub-slot m+2 and here $K_1=6$ which means that the corresponding HARQ-ACK is in sub-slot $m+2+K_1=m+8$. PDSCH #2 is transmitted in slot n+2 but occupies sub-slots m+4 and m+5. The reference for $K_1$ is relative to the sub-slot where the PDSCH ends, and in this case PDSCH #2 ends in sub-slot m+5. The DL Grant in DCI #2 that schedules PDSCH #2 indicates $K_1=4$, which schedules a PUCCH for its HARQ-ACK at sub-slot $m+5+K_1=$sub-slot m+9.

Semi-Persistent Scheduling (SPS)

As is well understood by those skilled in the art, a gNB uses a PDSCH for downlink data transmission to a UE. The PDSCH resources used for the transmission of the PDSCH can be scheduled by a gNB either dynamically, or through the allocation of Semi-Persistent Scheduling (SPS) resources.

Similarly to the use of Configured Grants (CGs) in the uplink, the use of SPS in the downlink reduces latency, particularly for regular and periodic traffic. The gNB is required to explicitly activate and deactivate SPS resources when it determines they may be required. These SPS resources are typically configured via Radio Resource Control (RRC) signalling, and occur periodically where each SPS PDSCH occasion has a pre-configured and fixed duration. This allows the gNB to schedule traffic that has a known periodicity and packet size. The gNB may or may not transmit any PDSCH in any given SPS PDSCH occasion, and so the UE is required to monitor each SPS PDSCH occasion for a potential PDSCH transmission.

In Rel-15 the UE can only be configured with one SPS PDSCH and this SPS PDSCH is activated using an activation DCI (Format 1_0 or 1_1) with the Cyclic Redundancy Code (CRC) scrambled with a Configured Scheduling Radio Network Temporary Identifier (CS-RNTI). Once an SPS PDSCH is activated, the UE will monitor for a potential PDSCH in each SPS PDSCH occasion of the SPS PDSCH configuration without the need for any DL Grant until the SPS PDSCH is deactivated. Deactivation of the SPS PDSCH is indicated via a deactivation DCI scrambled with CS-RNTI. The UE provides a HARQ-ACK feedback for the deactivation DCI, but no HARQ-ACK feedback is provided for an activation DCI.

Similar to DG-PDSCH, the slot containing the PUCCH resource for HARQ-ACK corresponding to SPS PDSCH is indicated using the $K_1$ value in the field "PDSCH-to-HARQ_feedback timing indicator" of the activation DCI. Since a dynamic grant is not used for SPS PDSCH, this $K_1$ value is applied for every SPS PDSCH occasion, and can only be updated after it has been deactivated and re-activated using another activation DCI with a different $K_1$ value.

Since there is only one SPS PDSCH, PUCCH Format 0 or 1 is used to carry the HARQ-ACK feedback. If the PUCCH collides with a PUCCH carrying HARQ-ACK feedback for a DG-PDSCH, the HARQ-ACK for SPS PDSCH is multiplexed into the PUCCH corresponding to the DG-PDSCH.

In Rel-16 the UE can be configured with up to eight SPS PDSCHs, where each SPS PDSCH has an SPS Configuration Index that is RRC configured. Each SPS PDSCH is individually activated using a DCI (Format 1_0, 1_1 & 1_2) with the CRC scrambled with CS-RNTI, where the DCI indicates the SPS Configuration Index of the SPS PDSCH to be activated. However, multiple SPS PDSCHs can be deactivated using a single deactivation DCI. Similar to Rel-15, the UE provides a HARQ-ACK feedback for the deactivation DCI, but does not provide one for the activation DCI.

The slot or sub-slot containing the PUCCH resource for HARQ-ACK feedback corresponding to an SPS PDSCH occasion is determined using the $K_1$ value indicated in the activation DCI. Since each SPS PDSCH configuration is individually activated, different SPS PDSCH can be indicated with different $K_1$ values.

Since different $K_1$ values can be used for different SPS PDSCH configurations, it is possible that the HARQ-ACK for multiple SPS PDSCHs point to the same slot or sub-slot, and in such a scenario, these HARQ-ACKs are multiplexed into a single PUCCH. For multiple SPS PDSCH configurations, PUCCH Format 2, 3 & 4 (in addition to PUCCH Format 0 & 1) can be used to carry multiple HARQ-ACKs for SPS PDSCH. Here, the HARQ-ACKs in the PUCCH are sorted in ascending order according to the DL slot for each of the SPS PDSCH Configuration Indices, and then sorted in ascending order of SPS PDSCH Configuration Index. It should be noted here that since typically the $K_1$ value is fixed per SPS PDSCH then it is unlikely to have two or more SPS PDSCH with the same index being multiplexed into a PUCCH.

Figure 7:
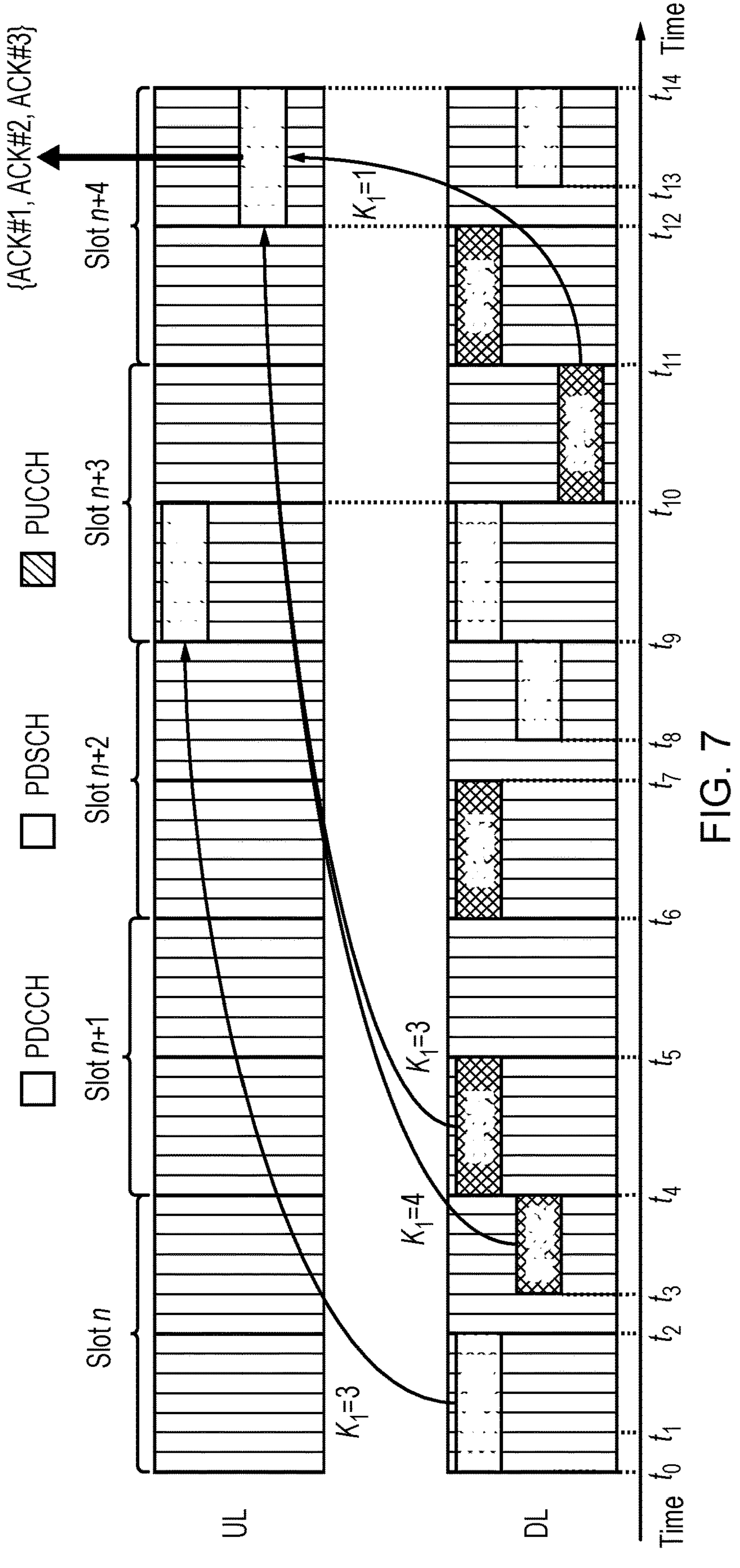
FIG. 7 illustrates how multiple HARQ-ACK feedback indications for Semi-Persistent Scheduling (SPS) Physical Downlink Shared Channels (PDSCHs) may be multiplexed onto a single PUCCH per sub-slot.

An example of this is shown in FIG. 7, where a UE is configured with three SPS PDSCHs labelled as SPS #1, SPS #2 and SPS #3 with different periodicities that are RRC configured with SPS Configuration Index 1, 2 and 3 respectively. SPS #1, SPS #2 and SPS #3 are activated with $K_1=3$, $K_1=4$ and $K_1=1$ respectively. These $K_1$ values result in the PUCCH for HARQ-ACK feedback corresponding to SPS #2 in Slot n, SPS #1 in Slot n+1 and SPS #3 in Slot n+3 being in the same slot, i.e. carried by PUCCH #2 in Slot n+4. PUCCH #2 therefore provides 3 HARQ-ACKs labelled as {ACK #1, ACK #2, ACK #3} for SPS #1, SPS #2 and SPS #3 respectively according to their SPS PDSCH Configuration Indices (it can be seen that, in this example, there is only one unique SPS PDSCH per DL slot that has HARQ-ACK multiplexed into PUCCH #2).

In Rel-16, when the PUCCH for an SPS PDSCH collides with the PUCCH for a DG-PDSCH, their HARQ-ACKs are multiplexed, where the SPS PDSCH HARQ-ACKs are appended after those for DG-PDSCH, if they have the same priority. Otherwise, one of the PUCCHs is prioritised.

Figure 8:
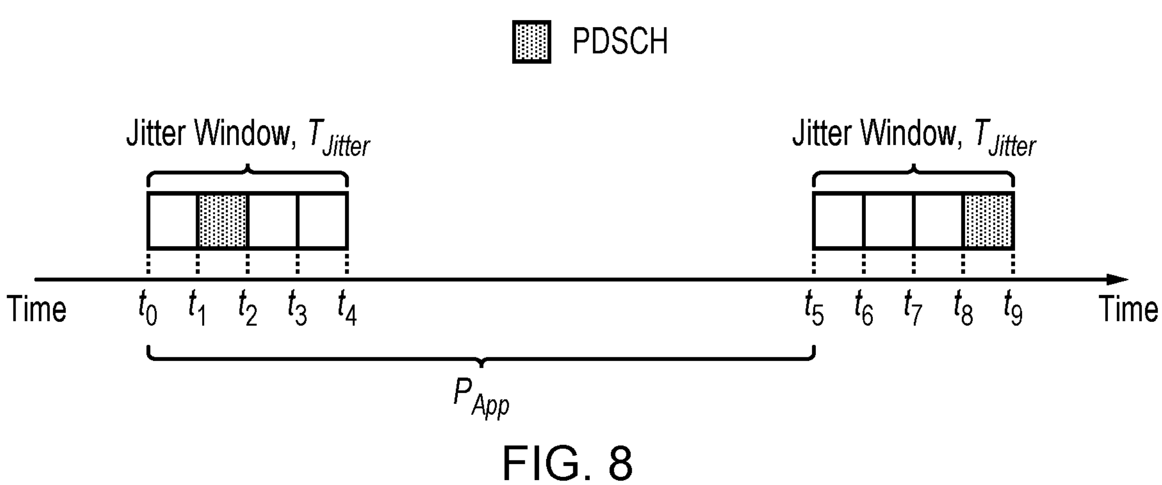
FIG. 8 shows an example of a jitter time window.

SPS PDSCH is introduced for traffic that is periodic with a fixed targeted bit rate. However, not all traffic would fit into the RRC configurable periodicity. Furthermore, some traffic experiences jittering where the application can have a fixed periodicity but due to jittering the arrival of the packet may be random within a time jitter window, $T_{Jitter}$. An example is shown in FIG. 8, where an application has periodic traffic with a periodicity of $P_{App}$. However, this traffic experiences jitter and so the actual packet arrival falls within a time window $T_{Jitter}$. In this example, the first jitter time window starts at time $t_0$ where the packet can arrive within this time window between $t_0$ to $t_4$ and here the packet arrives at time $t_1$. The next packet arrives after at least a time $P_{App}$ later, starting at time $t_5$, and here once again the packet can arrive at any time within the jitter time window between $t_5$ to $t_9$. In the second instance, the packet arrives at time $t_8$, which is towards the end of the jitter time window $T_{Jitter}$.

Figure 9:
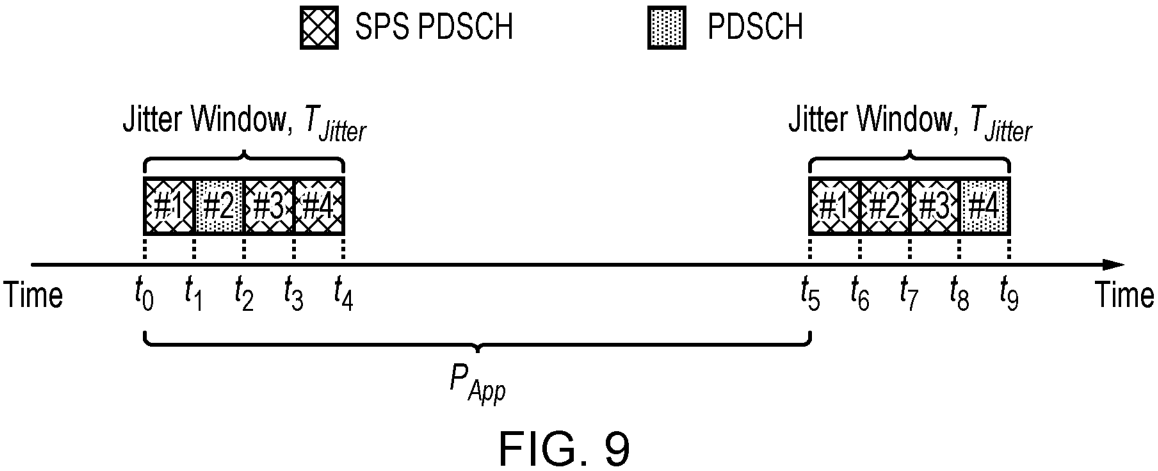
FIG. 9 shows an example of how SPS can be over-configured to compensate for jittering traffic.

In order to serve traffic with odd periodicity and traffic with jittering, the network may over-configure the number of SPS PDSCH resources than are required by the traffic. That is, instead of configuring one SPS PDSCH resource to serve an application, the network may configure more than one SPS PDSCH resource to serve an application. In order to overcome jittering, multiple SPS configurations with the same periodicity but different time offset may be used. In the example in FIG. 8, the UE can be configured with four SPS PDSCH configurations, such that these four SPS fall within the jitter time window and each has a periodicity of $P_{App}$. An example is shown in FIG. 9, where four SPS configurations labelled as #1, #2, #3 and #4 with periodicity $P_{App}$, but different offsets, are configured for a UE. Hence, by configuring multiple SPS resources, the UE is therefore provided with PDSCH resource whenever the packet data arrives within the jitter time window.

Figure 10:
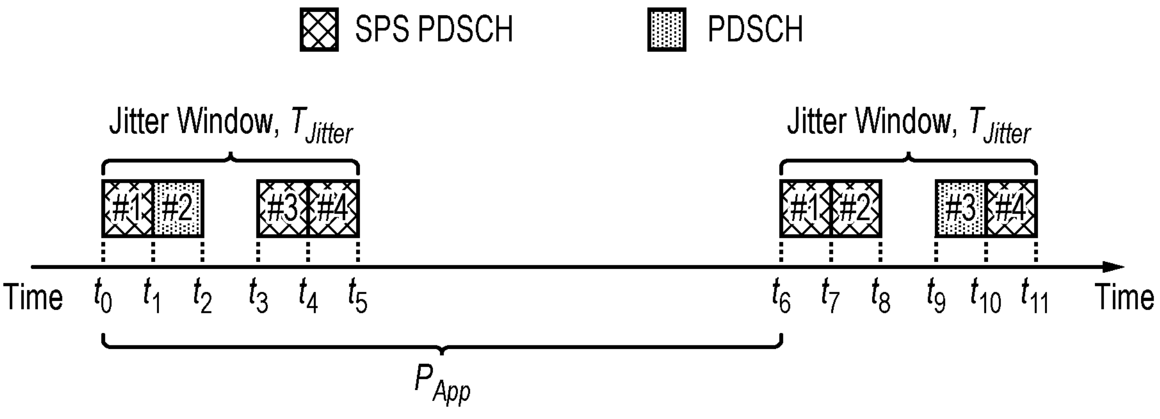
FIG. 10 shows an example of how gaps may be implemented between SPS instances within a jitter time window.

It should be appreciated that the SPS resources configured within a jitter time window do not need to be adjacent to each other and there can be gaps between two SPS instances. An example is shown in FIG. 10, where four SPS instances, SPS #1, SPS #2, SPS #3 and SPS #4, are configured to handle jitter and here there is a gap between SPS #2 and SPS #3. It should also be appreciated that over-configuration of SPS resources is not limited to only traffic types with jitter but can also be used for traffic types that do not have a periodicity that matches those that are configurable by RRC.

Figure 11:
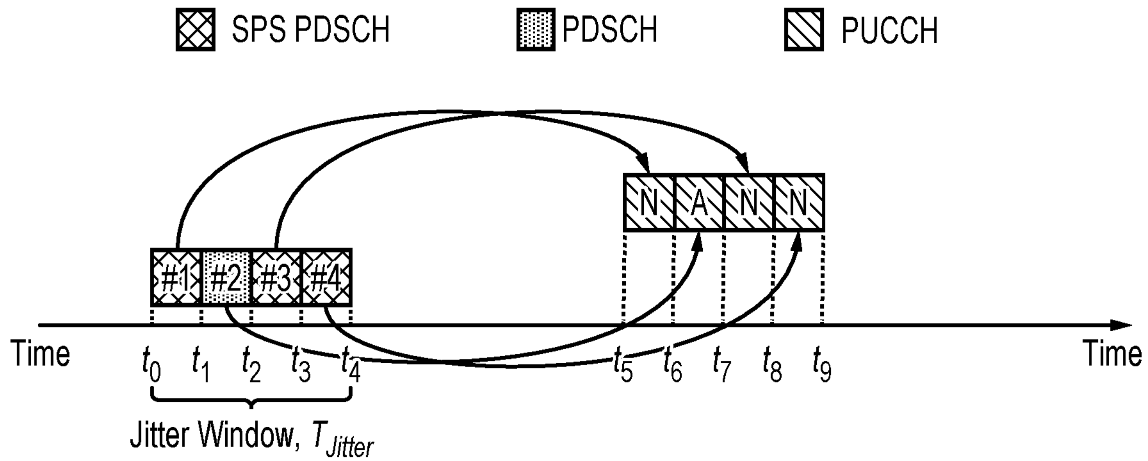
FIG. 11 shows an example of how the use of multiple SPS instances within a jitter time window may result in excessive HARQ-ACK feedback indications.

In Rel-16 SPS, the UE is required to feed back a NACK for an SPS that is unused, i.e. SPS resource that does not contain any PDSCH transmission. Therefore, over configurations of SPS PDSCH resources, for example to handle jitter, would lead to excessive HARQ-ACK overhead since only one of these SPS contains a valid PDSCH transmission. That is, within the jitter time window containing M SPS instances, only 1 out of M of these SPS instances has a valid PDSCH and therefore there would be an excess of M−1 HARQ-ACK feedbacks (where M−1 feedbacks would be NACK). An example is shown in FIG. 11, where N=4 SPS instances are configured within a jitter time window $T_{Jitter}$. Following Rel-16 behaviour, the UE would feedback all N HARQ-ACKs but only one HARQ-ACK, i.e. the one for SPS #2 transmitted between time $t_6$ to $t_7$, is beneficial to the gNB. Thereby the UE has transmitted an excess of N−1=3 HARQ-ACK feedbacks.

Some proposals have been made in [5] to reduce the HARQ-ACK overhead for SPS PDSCH. Two notable mechanisms proposed are to use an "AND" logical operation or an "OR" logical operation to compress or bundle N bits of SPS PDSCH HARQ-ACKs to Mbits, where M=1 in some proposals in [5].

Figure 12:
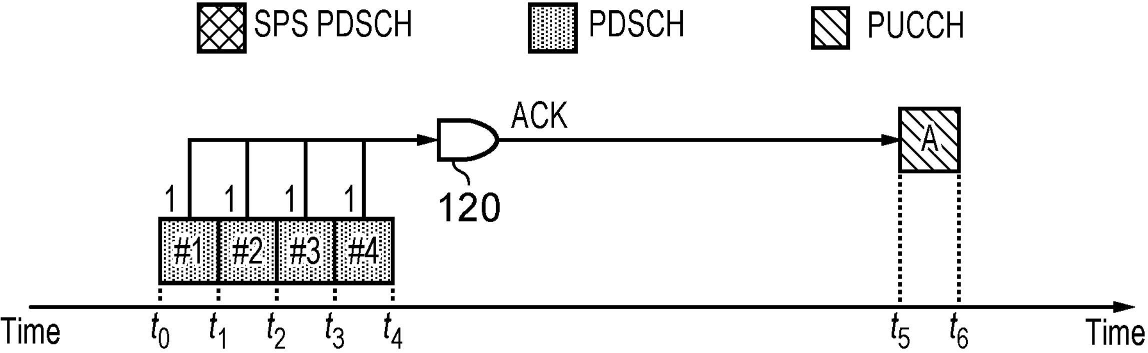
FIG. 12 shows an example of HARQ-ACK bundling for multiple SPS instances using a logical "AND" operator.

In an example of HARQ-ACK bundling, ACKs are input as "1" and NACKs are input as "0" to an "AND" logical operator 120 as shown in the example of FIG. 12, where HARQ-ACKs from SPS #1, SPS #2, SPS #3 and SPS #4 are bundling by feeding them into the "AND" logical operator 120. Here, the output of the "AND" operator 120 is an ACK only if the HARQ-ACKs from all SPSs under the bundling group are ACKs. Otherwise if any of the SPSs produce a NACK, the output would be a NACK. This method assumes that the PDSCHs in the bundling group of SPS are highly likely to be decoded correctly. However, if the SPS resources are over configured, then some of these SPS in the bundling group may not have any PDSCH and would lead to a NACK. Hence, any empty SPS would lead to a NACK at the output of the bundling.

Recognising that some SPS may be empty, an "OR" logical operator is proposed for HARQ-ACK bundling [6], specifically aimed at SPS over configuration to handle jittering. In HARQ-ACK bundling using "OR" logical operator, if any one of the N SPSs are decoded correctly, thereby producing an ACK, the bundled HARQ-ACK would output an ACK. Since over configuration of SPS resources for jittering assumes that only one out of N SPS contains a PDSCH whilst the remaining N−1 SPSs are empty, the "OR" logical operator would therefore indicate whether that one out of N SPSs is decoded correctly. An example is shown in FIG. 13, where there are N=4 over configured SPS to handle jitter, but here only a single HARQ-ACK is fed back to the gNB by bundling all N HARQ-ACK feedbacks using a logical "OR" operator 130.

Figures 13, 14:
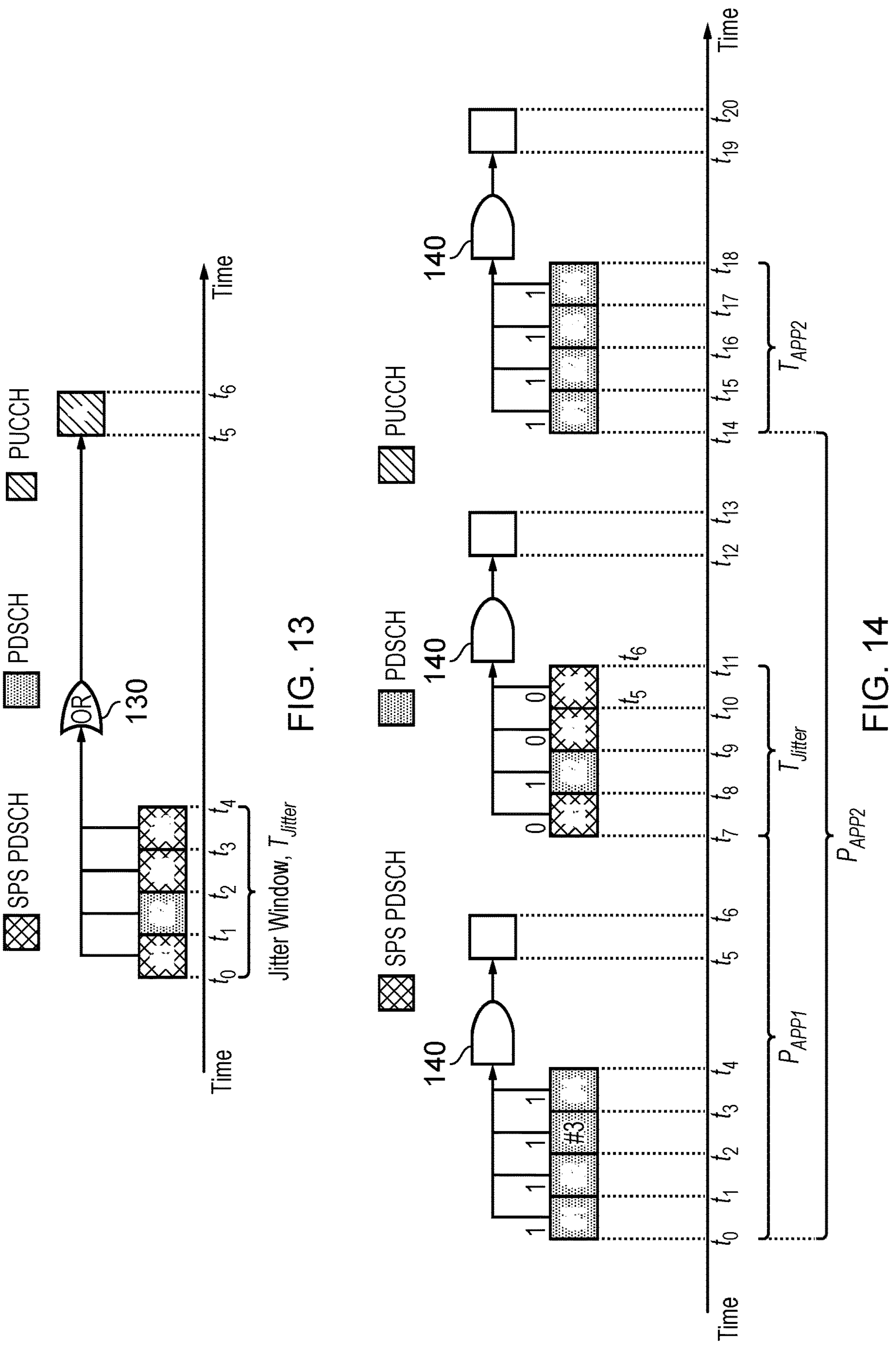
FIG. 13 shows an example of HARQ-ACK bundling for multiple SPS instances using a logical "OR" operator.
FIG. 14 shows an example of how HARQ-ACK bundling for multiple SPS instances using a logical "AND" operator cannot be adapted to changes in application between groups of SPS instances.

An example drawback of HARQ-ACK bundling, using either an "AND" or an "OR" operator, is illustrated by FIG. 14. Here, in the example of FIG. 14, there are two applications, which are referred to in FIG. 14 as APP1 and APP2 with periodicity $P_{APP1}$ and $P_{APP2}$ respectively, where $P_{APP2}=2\times P_{APP1}$. APP1 requires a single PDSCH to be transmitted every $P_{APP1}$ but suffers from jittering with a jitter time window $T_{Jitter}$ and so it requires over configuration of four SPS resources. APP2 requires three PDSCHs to be transmitted within $T_{APP2}$ at every $P_{APP2}$; it doesn't matter when exactly within the $T_{APP2}$ time window these are transmitted, but they must fall within that time window. Known solutions such as those detailed in [6] which configure a single logical operator would not be able to handle these two applications. Here, the gNB configures an "AND" operator 140 to cater for APP2 which would work for every $P_{APP2}$ on the four configured SPS since all of them would be occupied, i.e. one SPS to handle jittering for APP1 and three SPS to handle APP2. However, when APP2 is not present and only APP1 is used, the "AND" operator would fail, since three out of four SPS would be empty and the UE would always feedback a NACK.

Although the UE can attempt to detect the presence of a PDSCH in a SPS, for example by attempting to detect presence of demodulation reference signals (DMRS) and to not feed back HARQ-ACK for empty SPS, this may not be beneficial to the system. This is because the gNB may use the physical resources from one UE's SPS to schedule another, and this may then lead to both UE detecting presence of DMRS, which would lead to the UE with the SPS resource falsely detecting presence of DMRS. Furthermore, this would require the UE to perform an additional task of detecting for PDSCHs, prior to actually decoding the PDSCH, which would increase complexity and latency at the UE. Hence, methods for bundling HARQ-ACK containing empty SPS preferably will not require detection of PDSCH. The UE would attempt to decode the SPS as usual and, if the SPS is empty, the UE would naturally feed back a NACK.

A technical problem to solve here then is to find a HARQ-ACK bundling method that works for more than one application, i.e. regardless of whether the group of SPS is used to compensate for jittering or not, without requiring a prior re-configuration of the bundling method. That is, any such HARQ-ACK bundling method should give the gNB the freedom to dynamically use the group of SPS for different applications. Embodiments of the present disclosure seek to provide solutions to such technical issues.

Number of ACKs in an SPS Group

Figure 15:
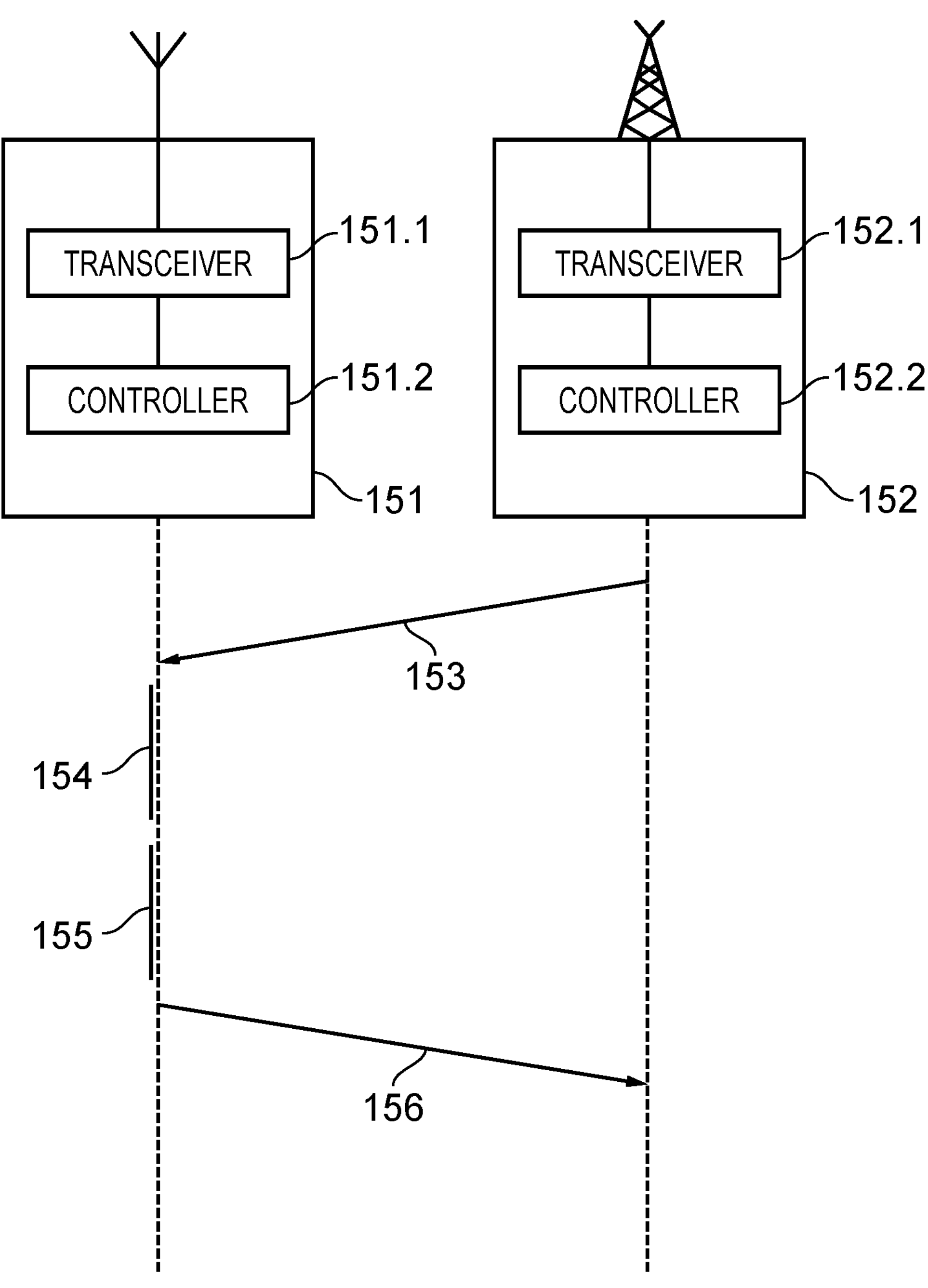
FIG. 15 shows a part schematic, part message flow diagram representation of a wireless communications system comprising a communications device and an infrastructure equipment in accordance with embodiments of the present technique.

FIG. 15 shows a part schematic, part message flow diagram representation of a first wireless communications system comprising a communications device 151 and an infrastructure equipment 152 in accordance with at least some embodiments of the present technique. The communications device 151 is configured to transmit signals to and/or receive signals from the wireless communications network, for example, to and from the infrastructure equipment 152. Specifically, the communications device 151 may be configured to transmit data to and/or receive data from the wireless communications network (e.g. to/from the infrastructure equipment 152) via a wireless radio interface provided by the wireless communications network (e.g. the Uu interface between the communications device 151 and the Radio Access Network (RAN), which includes the infrastructure equipment 152). The communications device 151 and the infrastructure equipment 152 each comprise a transceiver (or transceiver circuitry) 151.1, 152.1, and a controller (or controller circuitry) 151.2, 152.2. Each of the controllers 151.2, 152.2 may be, for example, a microprocessor, a CPU, or a dedicated chipset, etc.

As shown in the example of FIG. 15, the transceiver circuitry 151.1 and the controller circuitry 151.2 of the communications device 151 are configured in combination to receive 153, from the wireless communications network (e.g. from the infrastructure equipment 152), signals on one or more downlink channels, each of the downlink channels being within one of a plurality of downlink transmission occasions, to determine 154, for each of the downlink transmission occasions, a value of an acknowledgement bit indicating whether or not one of the signals has been successfully received by the communications device 151 on one of the downlink channels within that downlink transmission occasion, to perform 155, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, and to transmit 156, to the wireless communications network (e.g. to the infrastructure equipment 152), an indication of the one or more bundled bits (e.g. in a PUCCH or in a PUSCH).

Here, the downlink transmission occasions may be Semi-Persistent Scheduling (SPS) resource instances forming an SPS group, wherein the SPS resource instances are periodically located in a plurality of downlink resource units of the wireless radio interface. Indeed, many of the below examples described with reference to FIGS. 16 to 20 refer to SPS instances and SPS groups. However, those skilled in the art would appreciate that the downlink transmission occasions may be any form of pre-configured or dynamically configured resources (which may be indicated in a dynamic fashion by the wireless communications network/infrastructure equipment 152 to the communications device 151 such as in DCIs).

Here, the term bundling operation refers to the logical operation(s) performed by the communications device 151 in order to implement a bundling function to produce the bundled bits from the acknowledgement bits. The UE may determine the bundling function for example via signalling received by the network, and the bundling function is defined by the value(s) of the at least one bundling characteristic.

Essentially, embodiments of the present technique propose that N PDSCH HARQ-ACK bits for a group of SPS should be bundled to M bits, where N>M, where each of the M bit indicates whether a defined bundling function is successful. That is, a first bundling function would provide a first bundled HARQ-ACK bit, a second bundling function would provide a second bundled HARQ-ACK bit, and so on. By allowing the network to define a bundling function for each of the bundled bits, the network has the flexibility to use a group of SPS for various purposes or applications instead of being limited to a single purpose, e.g. only to jittering.

In an arrangement of embodiments of the present technique, the bundling function outputs an ACK if the UE successfully decodes at least $K_{MIN}$ PDSCH in the group of N SPS, where $N \geq K_{MIN} \geq 0$. That is, the group of SPS should produce a minimum of $K_{MIN}$ ACKs for the bundling function to produce an ACK.

Figure 16:
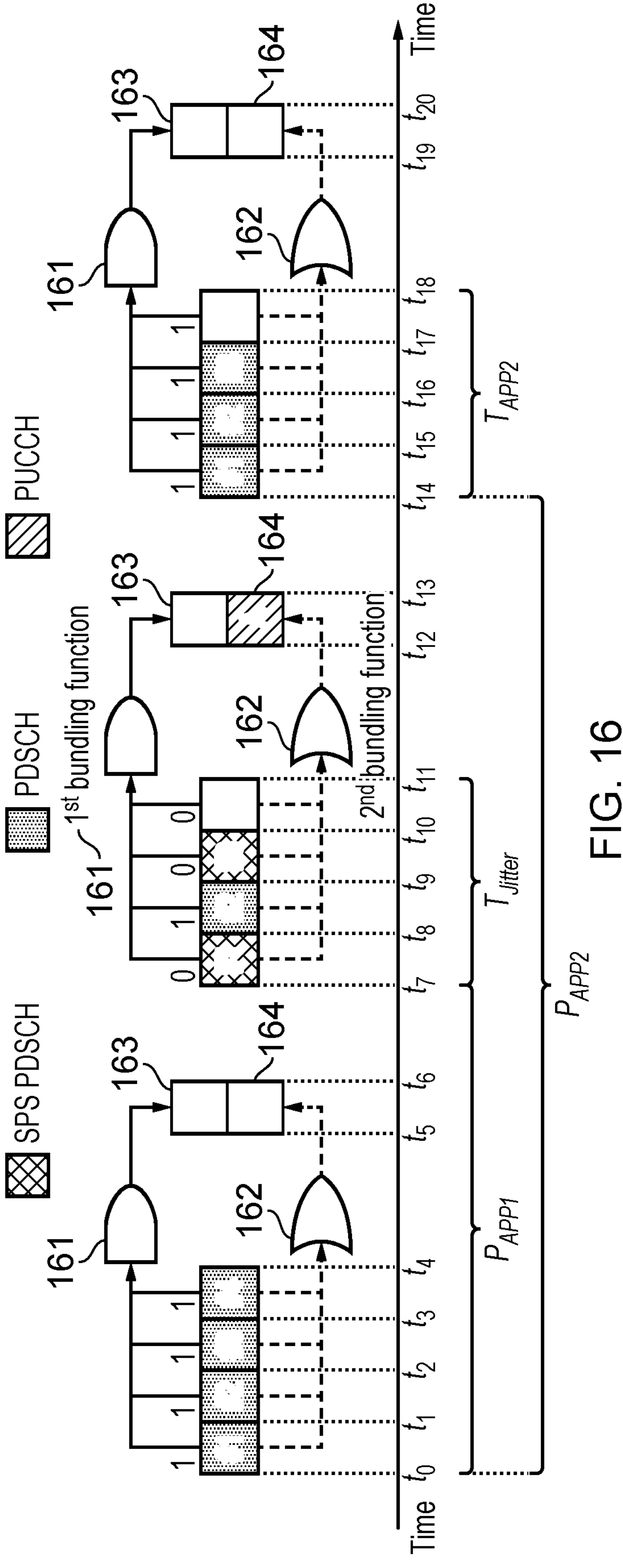
FIG. 16 shows an example of how HARQ-ACK bits for multiple SPS instances can be bundled into two bits using a logical "AND" operator and a logical "OR" operator in accordance with embodiments of the present technique.

Otherwise, if there are fewer than $K_{MIN}$ ACKs from among the group of SPS (i.e. fewer than $K_{MIN}$ PDSCH are successfully decoded from among the group of SPS), the bundling function outputs a NACK. An example of such a bundling function configuration and implementation, with N=4 and M=2, is shown in FIG. 16, where the two bundling functions 161, 162 represented by the M=2 bits 163, 164 are for $K_{MIN}=4$ and $K_{MIN}=1$. That is:

- First bundling function 161: Outputs ACK for the first M bit 163, if all, i.e. $K_{MIN}=4$ (since N=4), PDSCHs are successfully decoded in the group of N=4 SPS. Here, the first bundling function 161 outputs a NACK if any PDSCH in the SPS group is unsuccessfully decoded; and
- Second bundling function 162: Outputs ACK for the second M bit 164, if at least $K_{MIN}=1$ PDSCH is successfully decoded in the group of N=4 SPS. Here, the second bundling function 162 outputs a NACK if no PDSCH is successfully decoded.

In other words, the at least one bundling characteristic may comprise a minimum acknowledgement number ($K_{MIN}$) and the communications device 151 may be configured to determine, for each of at least one of the bundled bits, the bundling operation to be performed based on a value of $K_{MIN}$ associated with that bundled bit, and wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device 151 on one of the downlink channels is greater than or equal to the value of $K_{MIN}$ associated with that bundled bit, or a negative acknowledgement, NACK, if the values of the acknowledgement bits indicate that a number of the downlink transmission occasions within which one of the signals has been successfully received by the communications device 151 on one of the downlink channels is less than the value of $K_{MIN}$ associated with that bundled bit.

Those skilled in the art would appreciate that $K_{MIN}$ (or indeed any others of the one or more bundling characteristics discussed herein) may have any value from 1 to N (or even 0, though this would have limited use). Furthermore, $K_{MIN}$ may be different for each of the M bundling functions, or may have the same value for one or more (or all) of the M bundling functions, where M ranges from 1 to N (though again, a value of M=N would clearly have limited use). Bundling functions may each have a single stage, as is shown in the example of FIG. 16, or one or more of the bundling functions may have multiple stages (e.g. two OR operations in a first stage and then an AND operation taking the outputs of the two OR operations in a second stage).

In the example shown in FIG. 16, the UE implements the first bundling function 161 and second bundling function 162 by using an "AND" and an "OR" logical operator respectively on all the SPS in the group. This can be beneficial for the scenario described in FIG. 14, where two applications APP1 and APP2 are used. Hence, with reference to the example shown in FIG. 14, regardless whether APP1 or APP2 is used, the UE can feed back the appropriate bundled HARQ-ACK since the gNB is aware how many PDSCH it has sent to the UE within the group of bundled SPSs. Comparing to the example in FIG. 14, using the arrangement as exemplified by FIG. 16, at time $t_7$ to $t_{11}$, where only APP1 is used, the UE would be able to feed back a bundled HARQ-ACK using the "OR" operator implementing the second bundling function 162 which would indicate whether SPS #2 is decoded successfully.

It should be appreciated by those skilled in the art that the actual implementation of the bundling functions can be based on UE implementation; i.e., the UE itself decides what logical operator(s) or functionality blocks (referred to herein as bundling operations) to use based on the at least one bundling characteristic (e.g. $K_{MIN}$).

For example, consider the following configuration from the network on a group of N=4 SPS where the HARQ-ACK bits are to be bundled into M=2 bits. The bundling functions are:

- First bundling function: Outputs ACK for the first M bit, if at least $K_{MIN}$=2 PDSCHs are successfully decoded in the group of N=4 SPS; and
- Second bundling function: Outputs ACK for the second M bit, if at least $K_{MIN}$=1 PDSCH is successfully decoded in the group of N=4 SPS.

The gNB can configure these two bundling functions to handle jittering where one out of N=4 SPS is used, but also to be able to schedule PDSCHs for other traffic to the UE once in a while, using the remaining SPS resources, since they are already assigned to the UE. It would therefore be beneficial for the gNB to know, in addition to whether one of the PDSCHs has been correctly decoded, whether two or more PDSCHs have been decoded correctly when the gNB does use the SPS for other PDSCH scheduling in addition to handling jittering, so that it can provide the appropriate retransmissions.

Figure 17:
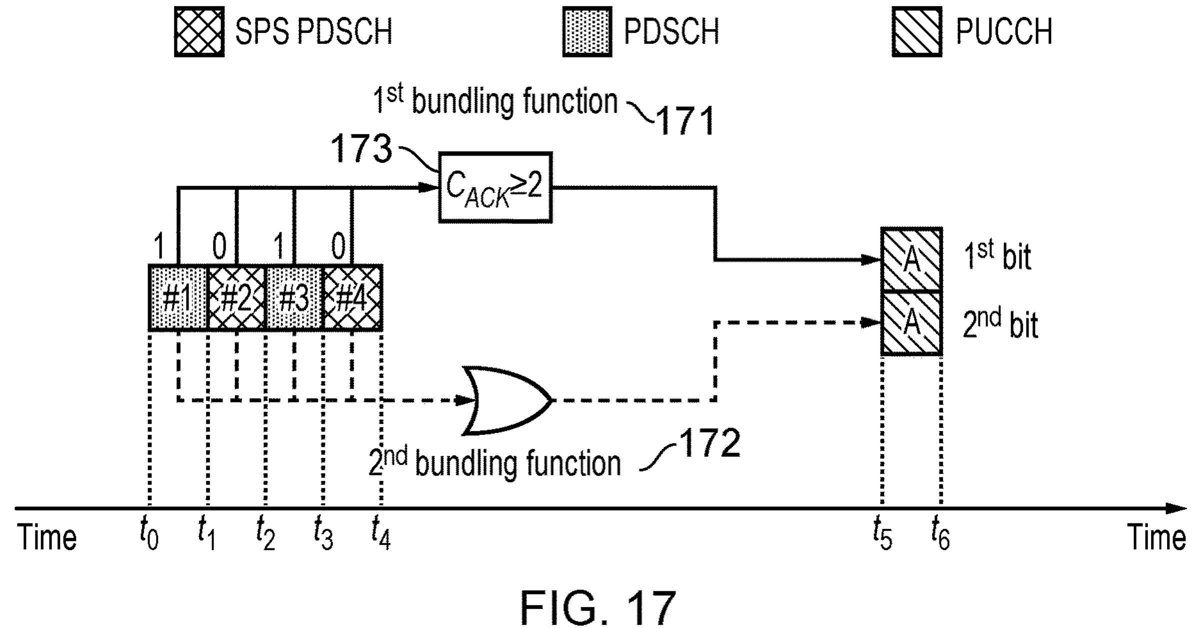
FIGS. 17 and 18 illustrate an example of how HARQ-ACK bundling can be performed for multiple SPS instances in the same manner using different bundling function implementations in accordance with embodiments of the present technique.

An example UE implementation of such a configuration is shown in FIG. 17, where the first bundling function 171 is implemented using a counter 173 on all the SPS HARQ-ACKs such that it outputs a "1" if the number of ACK counts $C_{ACK} \geq 2$ otherwise it outputs a "0". The second bundling function 172 is implemented using an "OR" logical operator on all the SPS HARQ-ACK outputs. In this example as shown by FIG. 17, SPS #1 and SPS #3 both contain PDSCHs which are successfully decoded, whilst SPS #2 and SPS #4 are both empty and therefore provides a NACK (or "0"). The bundled M=2 bits of this configuration (where $K_{MIN}$=2 for the first M bit and $K_{MIN}$=1 for the second M bit) are therefore {ACK, ACK}.

An alternative UE implementation to that illustrated by FIG. 17 and described above is shown in FIG. 18. In the alternative implementation shown in FIG. 18, for the first bundling function 171, instead of using the counter 173 as in the implementation of FIG. 17, the group of SPSs are divided into six subsets, i.e. {SPS #1, SPS #2}, {SPS #1, SPS #3}, {SPS #1, SPS #4}, {SPS #2, SPS #3}, {SPS #2, SPS #4} and {SPS #3, SPS #4}. Here, some of these subsets overlap each other. Each subset is fed into one of six "AND" logical operators 184 at a first stage of the first bundling function 171, and the output of these six "AND" operators 184 are fed into an "OR" operator 185 at a second stage of the first bundling function 171. Hence, if any two or more PDSCHs are decoded successfully the, first bit would provide an ACK. Otherwise, if only one or no PDSCHs are decoded successfully, the first bundling function 171 outputs a NACK. The second bundling function 172 can be implemented using an "OR" logical operator on all the N=4 SPS in the same manner as in the example implementation of FIG. 17. Hence it should be appreciated that the examples in FIGS. 17 and 18 show that a bundling function can be provided using different implementations at the UE.

Figure 18:
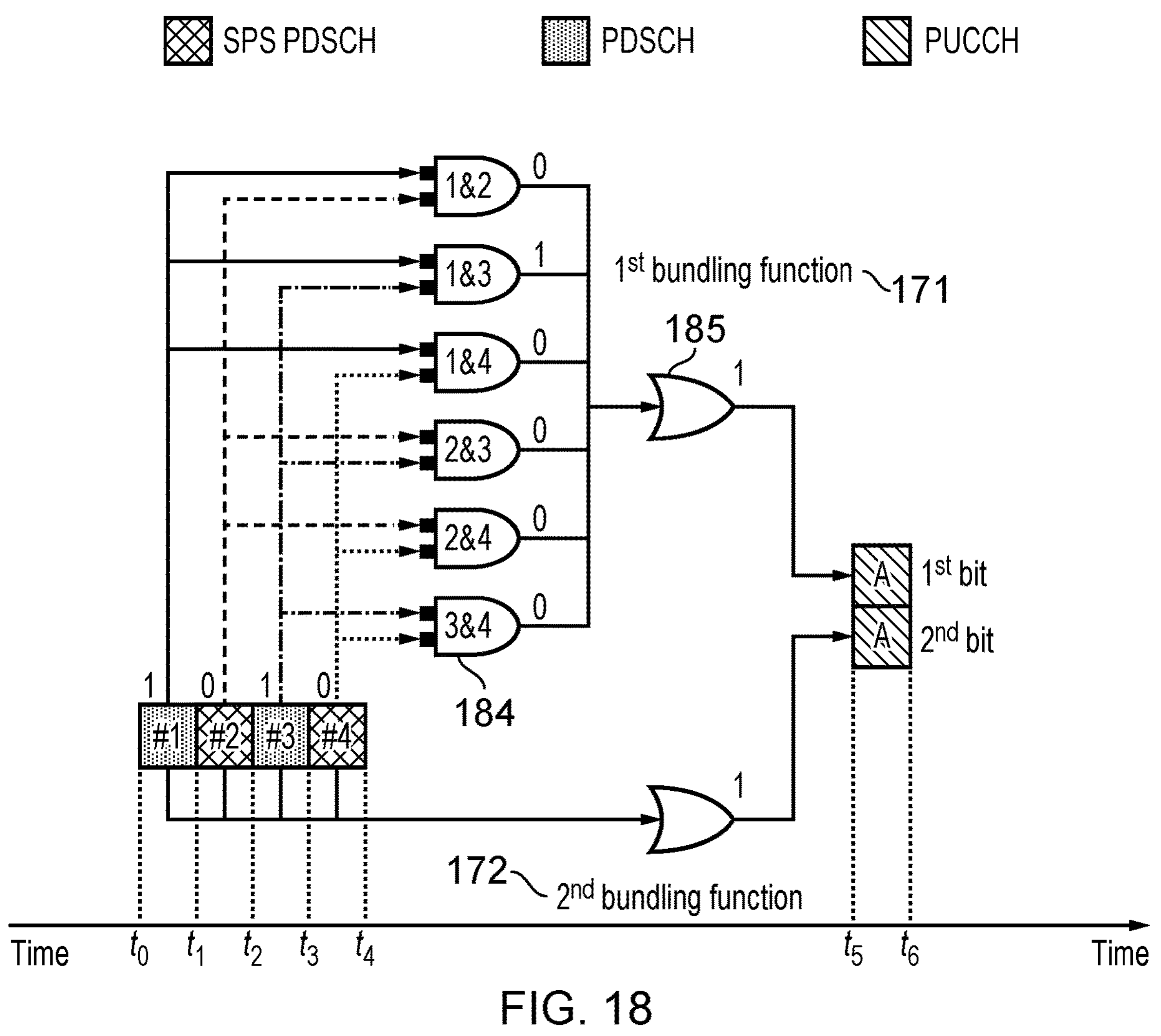

In other words, with reference to the example implementations of FIGS. 17 and 18, the communications device 151 may be configured to determine, for one or more of the at least one of the bundled bits, that a subset of more than one of the plurality of different bundling operations can be used to determine whether the number of acknowledgement bits is either greater than or equal to the value of $K_{MIN}$ associated with the one or more of the at least one of the bundled bits or less than the value of $K_{MIN}$ associated with the one or more of the at least one of the bundled bits, and to select, for the one or more of the at least one of the bundled bits, the performed bundling operation from among the subset of different bundling operations.

In another arrangement of embodiments of the present technique, the bundling function outputs an ACK if only $K_{EXACT}$ PDSCHs are successfully decoded, and otherwise it outputs a NACK.

In other words, the at least one bundling characteristic may comprise an exact acknowledgement number ($K_{EXACT}$) and the communications device may be configured to determine, for each of at least one of the bundled bits, the bundling operation to be performed based on a value of $K_{EXACT}$ associated with that bundled bit, and wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device 151 on one of the downlink channels is equal to the value of $K_{EXACT}$ associated with that bundled bit, or a negative acknowledgement, NACK, if the values of the acknowledgement bits indicate that a number of the downlink transmission occasions within which one of the signals has been successfully received by the communications device 151 on one of the downlink channels is not equal to the value of $K_{EXACT}$ associated with that bundled bit.

An example bundling function configuration using $K_{EXACT}$ as a bundling characteristic for a group of N=4 SPS and M=2 bits are as follows:

- First bundling function: Outputs ACK for the first M bit, if $K_{EXACT}$=3, otherwise outputs NACK; and
- Second bundling function: Outputs ACK for the second M bit, if $K_{EXACT}$=N, otherwise outputs NACK.

Figure 19:
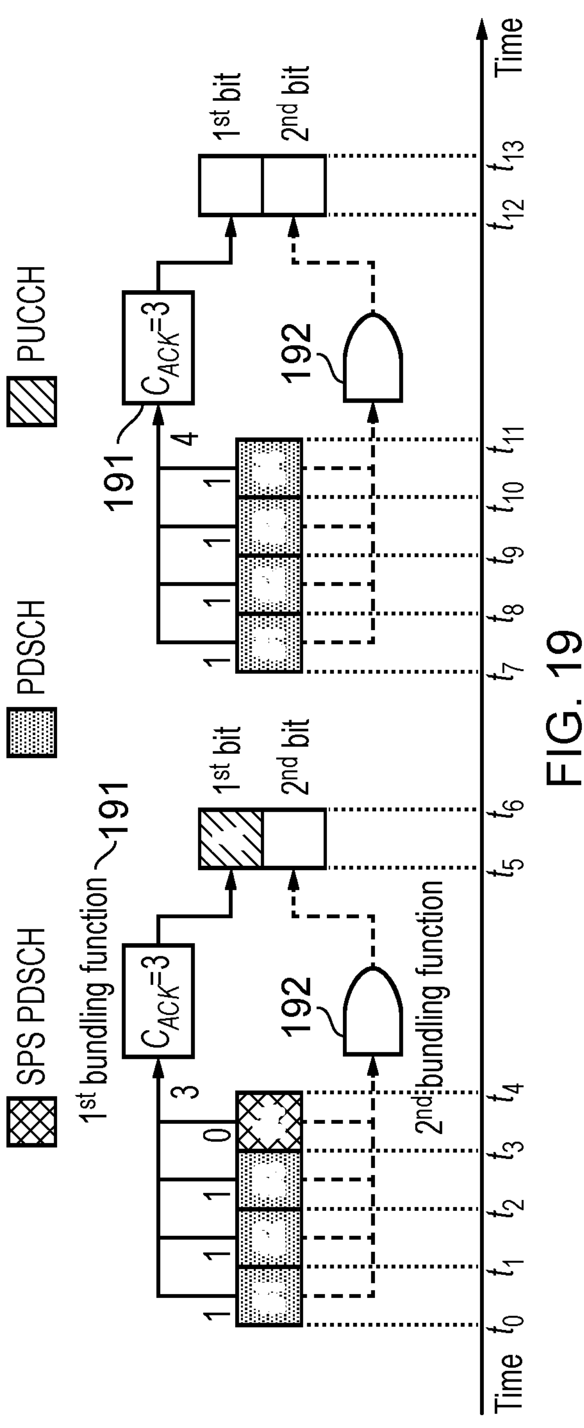
FIG. 19 shows an example of how HARQ-ACK bits for multiple SPS instances can be bundled into two bits each indicating whether or not a set number of the HARQ-ACK bits indicate an ACK in accordance with embodiments of the present technique.

FIG. 19 shows an example implementation of these two bundling functions, where the first bundling function 191 uses a counter such that it only outputs "1" if the number of ACKs counts $C_{ACK}$, from the group of SPS is exactly three, and otherwise it outputs a NACK. The second bundling function is implemented using an "AND" logical operator on all the SPS. At time $t_0$ to $t_4$, SPS #1, SPS #2 and SPS #3 contains PDSCH, which are decoded correctly, whilst SPS #4 is empty, and therefore using the two bundling functions, an ACK will be output for the first bit and a NACK will be output for the second bit. At time $t_7$ to $t_{11}$, all SPSs contain PDSCHs, and they are all decoded correctly. This therefore leads to a NACK and an ACK indicated by the first bit and the second bit respectively.

It should of course be appreciated that other implementations to that illustrated by FIG. 19 are possible in a similar manner to that described above for $K_{MIN}$ and illustrated with respect to FIGS. 17 and 18. For example, $K_{EXACT}$=4 may be implemented using either of an AND gate or a counter where $C_{ACK}$=4. In other words, the communications device may be configured to determine, for one or more of the at least one of the bundled bits, that a subset of more than one of the plurality of different bundling operations can be used to determine whether the number of acknowledgement bits is either equal to the value of $K_{EXACT}$ associated with the one or more of the at least one of the bundled bits or not equal to the value of $K_{EXACT}$ associated with the one or more of the at least one of the bundled bits, and to select, for the one or more of the at least one of the bundled bits, the performed bundling operation from among the subset of different bundling operations.

In another arrangement of embodiments of the present technique, the bundling function outputs an ACK if the number of successfully decoded PDSCHs, $S_{PDSCH}$, is within a range; i.e. $K_{R\text{-}MIN} \leq S_{PDSCH} \leq K_{R\text{-}MIN}$, where $K_{R\text{-}MIN}$ and $K_{R\text{-}MIN}$ respectively define the lower and upper ends of that range. Otherwise, if $S_{PDSCH}$ is outside of this range, the bundling function outputs a NACK.

In other words, the at least one bundling characteristic may comprise both of a lower limit acknowledgement number ($K_{R\text{-}MIN}$) and an upper limit acknowledgement number ($K_{R\text{-}MAX}$) and the communications device 151 may be configured to determine, for each of at least one of the bundled bits, the bundling operation to be performed based on both a value of $K_{R\text{-}MIN}$ and a value of $K_{R\text{-}MAX}$ associated with that bundled bit, and wherein each of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device 151 on one of the downlink channels is within a range defined by the values of $K_{R\text{-}MIN}$ and $K_{R\text{-}MAX}$ associated with that bundled bit, or a negative acknowledgement, NACK, if the values of the acknowledgement bits indicate that a number of the downlink transmission occasions within which one of the signals has been successfully received by the communications device 151 on one of the downlink channels is outside of the range defined by the values of $K_{R\text{-}MIN}$ and $K_{R\text{-}MAX}$ associated with that bundled bit.

Here, it may be the case that $K_{R\text{-}MIN} \leq S_{PDSCH} \leq K_{R\text{-}MIN}$ as described above—i.e. in other words the number of the downlink transmission occasions within which one of the signals has been successfully received by the communications device 151 on one of the downlink channels is determined to be within the range defined by the values of $K_{R\text{-}MIN}$ and $K_{R\text{-}MAX}$ if the number of the downlink transmission occasions within which one of the signals has been successfully received by the communications device 151 on one of the downlink channels is either between the values of $K_{R\text{-}MIN}$ and $K_{R\text{-}MAX}$ or equal to the values of $K_{R\text{-}MIN}$ and $K_{R\text{-}MAX}$. However, in other arrangements, it may be the case that $K_{R\text{-}MIN} < S_{PDSCH} < K_{R\text{-}MIN}$; i.e. that an ACK may be signalled if $S_{PDSCH}$ is between $K_{R\text{-}MIN}$ and $K_{R\text{-}MAX}$ but not if $S_{PDSCH}$ equals either of $K_{R\text{-}MIN}$ or $K_{R\text{-}MAX}$.

In other words, the number of the downlink transmission occasions within which one of the signals has been successfully received by the communications device on one of the downlink channels is determined to be within the range defined by the values of $K_{R\text{-}MIN}$ and $K_{R\text{-}MAX}$ if the number of the downlink transmission occasions within which one of the signals has been successfully received by the communications device on one of the downlink channels is between the values of $K_{R\text{-}MIN}$ and $K_{R\text{-}MAX}$ and not equal to either of the values of $K_{R\text{-}MIN}$ or $K_{R\text{-}MAX}$. Those skilled in the art would appreciate that the values of $K_{R\text{-}MIN}$ and $K_{R\text{-}MAX}$ may be different for different ones of the M bits for which such bundling characteristics are used, or may be the same for two or more of the M bundled bits. Furthermore, in some implementations, only one of $K_{R\text{-}MIN}$ and $K_{R\text{-}MAX}$ may be set for one or more of the M bits—i.e., only a lower or upper limit for $S_{PDSCH}$ may be configured.

Again, as with the other bundling characteristic discussed above such as $K_{MIN}$ or $K_{EXACT}$, the actual implementation of the bundling operations may be up to the UE's implementation. For example, while counters may be used to define each of $K_{R\text{-}MIN}$ and $K_{R\text{-}MAX}$ which may have respective values of 1 and 3, an OR operator may be used instead of a counter in some implementations for $K_{R\text{-}MIN}$. In other words, the communications device may be configured to determine, for one or more of the at least one of the bundled bits, that a subset of more than one of the plurality of different bundling operations can be used to determine whether the number of acknowledgement bits is within the range defined by the values of $K_{R\text{-}MIN}$ and $K_{R\text{-}MAX}$ associated with the one or more of the at least one of the bundled bits, and to select, for the one or more of the at least one of the bundled bits, the performed bundling operation from among the subset of different bundling operations.

Figure 20:
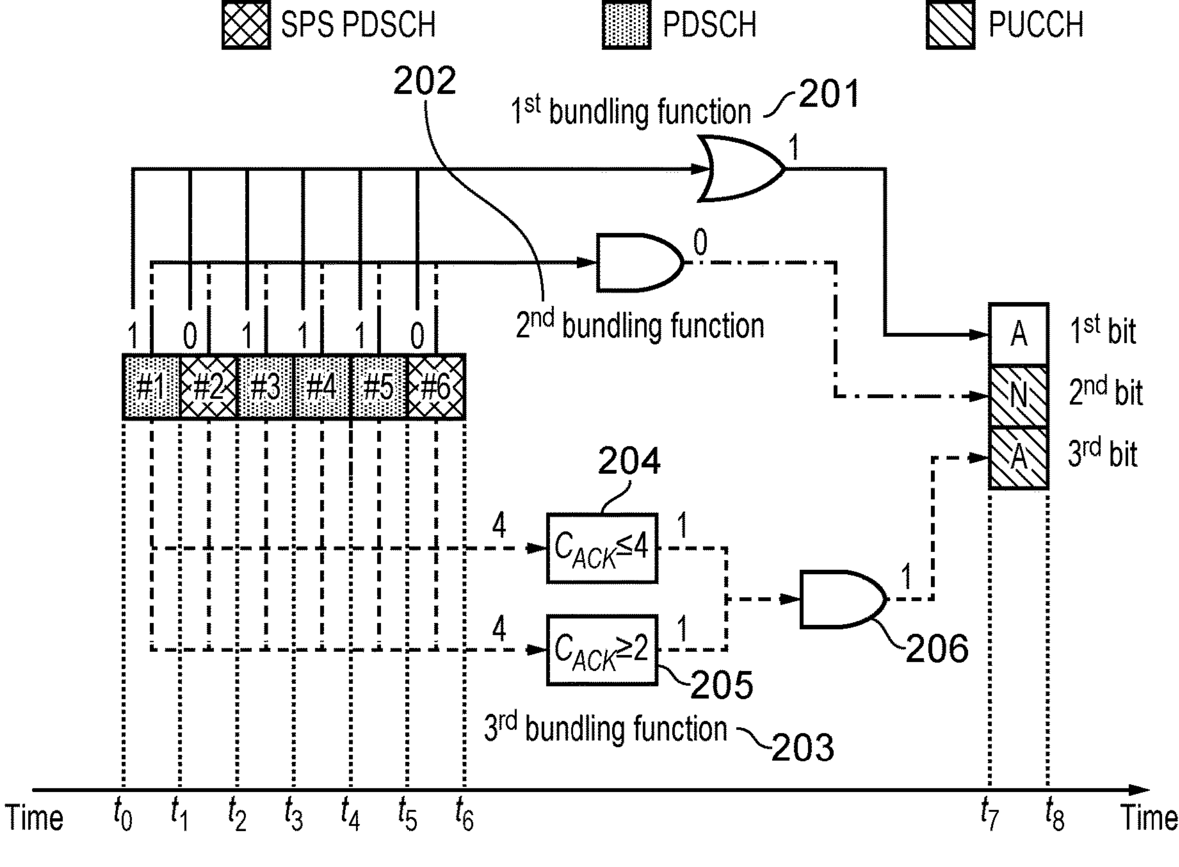
FIG. 20 shows an example of how HARQ-ACK bits for multiple SPS instances can be bundled into three bits each by employing three different bundling functions in accordance with embodiments of the present technique.

It should be appreciated that different bundling characteristics and/or different bundling functions can be mixed and more than two bundling functions can be configured. Furthermore, the number of SPS in a group (i.e. N) is not limited to four, and can be any suitable number which may be either higher or lower than four. For example, a configuration for N=6 SPS in a group can have three bundling functions (i.e. M=3) using different embodiments above and with one possible implementation as illustrated by FIG. 20:

- First bundling function 201: Outputs ACK for the first M bit, if at least $K_{MIN}$=1 PDSCH is decoded successfully. This is implemented using an "OR" logical operator on all the SPSs;
- Second bundling function 202: Outputs ACK for the second M bit, if $K_{EXACT}$=6 PDSCH are decoded successfully. This is implemented using an "AND" logical operator on all the SPSs; and
- Third bundling function 203: Outputs ACK for the third M bit, if number of successfully decoded PDSCH $S_{PDSCH}$, is between 2 and 4, i.e. $K_{R\text{-}MIN}$=2 and $K_{R\text{-}MAX}$=4 such that $2 \leq S_{PDSCH} \leq 4$. This is implemented using two counters 204, 205 at a first stage and an "AND" logical operator 206 at a second stage, where:
  - At the first counter 204, a "1" is output if the number of successfully decoded PDSCHs, i.e. the number of ACK counts, is $C_{ACK1} \leq 4$;
  - At the second counter 205, a "1" is output if the number of successfully decoded PDSCHs, i.e. the number of ACK counts, is $C_{ACK1} \geq 2$; and The outputs of the first counter 204 and the second counter 205 are fed into an "AND" logical operator 206.

It should be appreciated that other implementations which make use of different bundling operations can be constructed according to UE implementation. The gNB needs only define the type of function (i.e. the bundling characteristic such as $K_{MIN}$ or $K_{EXACT}$) and the parameter of that function (e.g. that $K_{EXACT}=3$).

In an arrangement of embodiments of the present technique, the number of SPS in a group for bundling N, the number of bundled bits M and each of the M functions, e.g. bundling characteristics $K_{MIN}$, $K_{EXACT}$, $K_{R-MIN}$ and $K_{R-MAX}$, may be configured by the network and signalled to the UE via RRC signalling. In other words, the communications device 151 may be configured to receive Radio Resource Control (RRC) signalling from the wireless communications network (e.g. from the infrastructure equipment 152), wherein the RRC signalling comprises one or more of an indication of the plurality of downlink transmission occasions, an indication of a number of the bundled bits which the communications device 151 is to transmit to the wireless communications network (e.g. to the infrastructure equipment 152), and, for each of the bundled bits which is to be transmitted, the at least one bundling characteristic.

Alternatively, in another arrangement of embodiments of the present technique, the number of SPS in a group for bundling N, the number of bundled bits M and each of the M functions, e.g. bundling characteristics $K_{MIN}$, $K_{EXACT}$, $K_{R-MIN}$ and $K_{R-MAX}$, may be configured by the network and signalled to the UE via MAC CE signalling. In other words, the communications device 151 may be configured to receive, from the wireless communications network (e.g. from the infrastructure equipment 152), a Medium Access Control (MAC) Control Element (CE) wherein the MAC CE comprises one or more of an indication of the plurality of downlink transmission occasions, an indication of a number of the bundled bits which the communications device 151 is to transmit to the wireless communications network (e.g. to the infrastructure equipment 152), and, for each of the bundled bits which is to be transmitted, the at least one bundling characteristic.

In another arrangement of embodiments of the present technique, the network may configure multiple sets of bundling functions, where each set is assigned an index. The gNB then signals (e.g. by indicating the index of) one of these set of functions to the UE via DCI, e.g. an activation or deactivation DCI for one or more of the SPS instances or the SPS group as a whole.

In other words, the communications device 151 may be configured to receive a dynamic indication from the wireless communications network (e.g. from the infrastructure equipment 152), and to determine, based on the dynamic indication, one or more of the plurality of downlink transmission occasions, a number of the bundled bits which the communications device 151 is to transmit to the wireless communications network (e.g. to the infrastructure equipment 152), and, for each of the bundled bits which is to be transmitted, the at least one bundling characteristic. Here, the communications device 151 may be configured to receive, from the wireless communications network (e.g. from the infrastructure equipment 152), one of an activation downlink control information, DCI, indicating that one or more of the downlink transmission occasions are activated and therefore are monitored and decoded by the communications device 151 for downlink signals from the wireless communications network (e.g. from the infrastructure equipment 152), and a deactivation DCI indicating that one or more of the downlink transmission occasions are deactivated and therefore are not monitored by the communications device 151 for downlink signals from the wireless communications network (e.g. from the infrastructure equipment 152), wherein a field of the one of the activation DCI and the deactivation DCI comprises the dynamic indication. Furthermore, here, the dynamic indication may comprise an indication of the plurality of downlink transmission occasions and an indication of one of a plurality of preconfigured bundling operation sets, wherein each of the bundling operation sets defines both the number of the bundled bits which the communications device 151 is to transmit to the wireless communications network (e.g. to the infrastructure equipment 152), and, for each of the bundled bits which is to be transmitted, the at least one bundling characteristic. This field of the activation/deactivation DCI may be a new field which is dedicated to the purpose of carrying the dynamic indication, or may be an existing field which is additionally used to carry the dynamic indication. Furthermore, the field of the activation/deactivation DCI may indicate an identifier of the SPS group for each of the SPS resource instances, or may indicate a resource of the wireless radio interface in which the indication of the one or more bundled bits should be transmitted, and where the communications device 151 may be configured to determine that the SPS group is formed by the plurality of SPS instances when the field indicates that the indication of the one or more bundled bits should be transmitted in the same resource for all of the plurality of SPS instances.

For example, the gNB can configure four sets of functions, for an N=6 SPS group as described in Table I below. The gNB then use a two-bit indicator indicated by a DCI to indicate which set of bundling functions the UE should use. It should be noted that depending on which set is indicated, the number of bundled HARQ-ACK bits M, may be different. One of the indices may be used to indicate "No Bundling", e.g. Index 0 in Table I, in which case the UE does not perform any bundling on the HARQ-ACK from each SPS, and uses instead the conventional HARQ-ACK reporting method. Again, those skilled in the art would appreciate that the number of functions and indices, the values of M and N for each index, and the bundling characteristics used and their values, all may be configured in any suitable way and having any suitable value, not limited to those shown in Table I below or described with respect to any of the examples discussed herein.

TABLE I

Example set of bundling functions

| Set Index | Bundling Functions |
|---|---|
| 0 | No Bundling |
| 1 | 1st function: Output ACK if $2 \leq S_{PDSCH} \leq N$ |
| 2 | 1st function: Output ACK if at least $K_{MIN} = 1$ PDSCH is decoded successfully<br>2nd function: Output ACK if $K_{EXACT} = 3$ PDSCH are decoded successfully<br>3rd function: Output ACK if $2 \leq S_{PDSCH} \leq 4$ |
| 3 | 1st function: Output ACK if $K_{EXACT} = N$ PDSCH are decoded successfully<br>2nd function: Output ACK if $K_{EXACT} = 2$ PDSCH are decoded successfully |

In the RRC configuration/MAC CE/DCI which signals the index, or in Table I itself (which is commonly known to both of the communications device 151 and the wireless communications network/infrastructure equipment 152 and may either be fixed in the specifications or configured/updated and signalled appropriately by the network), an order of the M bits may also be included explicitly so that the UE knows which Mbit is associated with which bundling characteristic and its value. Alternatively, the UE may assume that the first indicated bundling characteristic and value applies to the first of the M bits, the second to the second, and so on (e.g. if Table I in index 3 indicates only $K_{EXACT}$=N, $K_{EXACT}$=2, the UE assumes that $K_{EXACT}$=N applies to the first of the two M bits, while $K_{EXACT}$=2 applies to the second of the two M bits).

Figure 21:
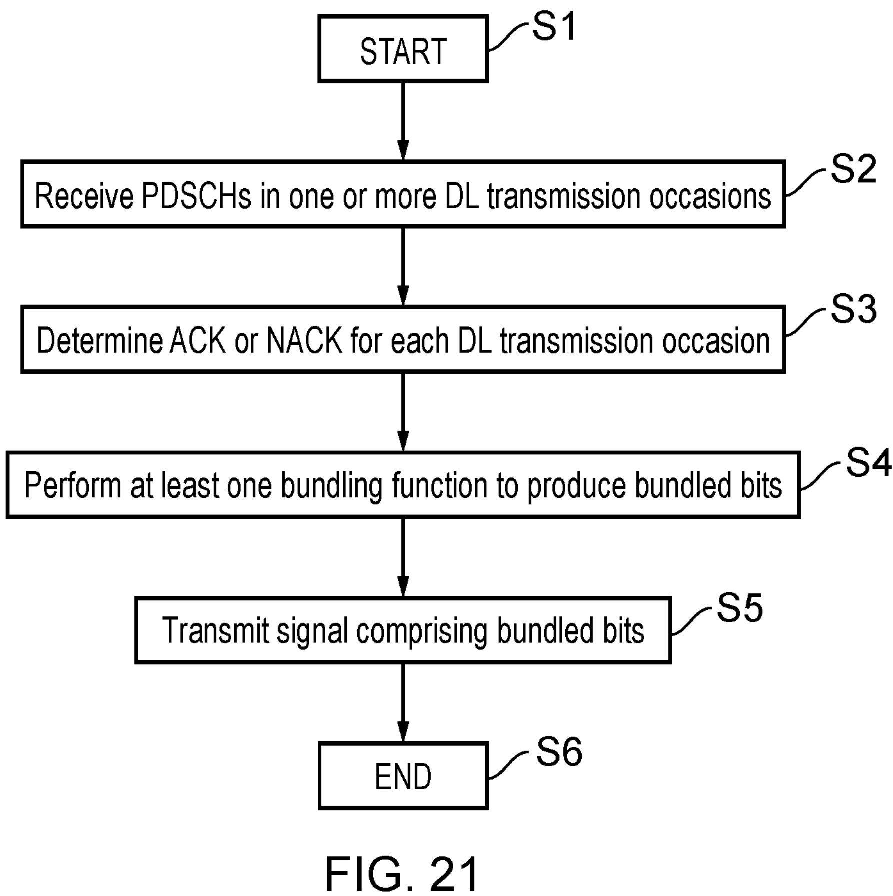
FIG. 21 shows a flow diagram illustrating a process of communications in a communications system in accordance with embodiments of the present technique.

FIG. 21 shows a flow diagram illustrating an example process of communications in a communications system in accordance with embodiments of the present technique. The process shown by FIG. 21 is a method of operating a communications device configured to transmit signals to and/or to receive signals from a wireless communications network (e.g. to or from an infrastructure equipment of the wireless communications network).

The method begins in step S1. The method comprises, in step S2, receiving, from the wireless communications network, signals on one or more downlink channels, each of the downlink channels being within one of a plurality of downlink transmission occasions. In step S3, the process comprises determining, for each of the downlink transmission occasions, a value of an acknowledgement bit indicating whether or not one of the signals has been successfully received by the communications device on one of the downlink channels within that downlink transmission occasion. In step S4, the method comprises performing, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations. Then, in step S5, the process comprises transmitting, to the wireless communications network, an indication of the one or more bundled bits. The process ends in step S6.

Those skilled in the art would appreciate that the method shown by FIG. 21 may be adapted in accordance with embodiments of the present technique. For example, other intermediate steps may be included in either or both of these methods, or the steps may be performed in any logical order. Though embodiments of the present technique have been described largely by way of the example communications system shown in FIG. 15, and described by way of the arrangements shown by FIGS. 16 to 20, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device configured to transmit signals to and/or to receive signals from a wireless communications network via a wireless radio interface provided by the wireless communications network, the method comprising receiving, from the wireless communications network, signals on one or more downlink channels, each of the downlink channels being within one of a plurality of downlink transmission occasions, determining, for each of the downlink transmission occasions, a value of an acknowledgement bit indicating whether or not one of the signals has been successfully received by the communications device on one of the downlink channels within that downlink transmission occasion, performing, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, and transmitting, to the wireless communications network, an indication of the one or more bundled bits.

Paragraph 2. A method according to Paragraph 1, wherein the at least one bundling characteristic comprises a minimum acknowledgement number, $K_{MIN}$, and the method comprises determining, for each of at least one of the bundled bits, the bundling operation to be performed based on a value of $K_{MIN}$ associated with that bundled bit, and wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is greater than or equal to the value of $K_{MIN}$ associated with that bundled bit, or a negative acknowledgement, NACK, if the values of the acknowledgement bits indicate that a number of the downlink transmission occasions within which one of the signals has been successfully received by the communications device on one of the downlink channels is less than the value of $K_{MIN}$ associated with that bundled bit.

Paragraph 3. A method according to Paragraph 2, comprising determining, for one or more of the at least one of the bundled bits, that a subset of more than one of the plurality of different bundling operations can be used to determine whether the number of acknowledgement bits is either greater than or equal to the value of $K_{MIN}$ associated with the one or more of the at least one of the bundled bits or less than the value of $K_{MIN}$ associated with the one or more of the at least one of the bundled bits, and selecting, for the one or more of the at least one of the bundled bits, the performed bundling operation from among the subset of different bundling operations.

Paragraph 4. A method according to any of Paragraphs 1 to 3, wherein the at least one bundling characteristic comprises an exact acknowledgement number, $K_{EXACT}$, and the method comprises determining, for each of at least one of the bundled bits, the bundling operation to be performed based on a value of $K_{EXACT}$ associated with that bundled bit, and wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is equal to the value of $K_{EXACT}$ associated with that bundled bit, or a negative acknowledgement, NACK, if the values of the acknowledgement bits indicate that a number of the downlink transmission occasions within which one of the signals has been successfully received by the communications device on one of the downlink channels is not equal to the value of $K_{EXACT}$ associated with that bundled bit.

Paragraph 5. A method according to Paragraph 4, comprising determining, for one or more of the at least one of the bundled bits, that a subset of more than one of the plurality of different bundling operations can be used to determine whether the number of acknowledgement bits is either equal to the value of $K_{EXACT}$ associated with the one or more of the at least one of the bundled bits or not equal to the value of $K_{EXACT}$ associated with the one or more of the at least one of the bundled bits, and selecting, for the one or more of the at least one of the bundled bits, the performed bundling operation from among the subset of different bundling operations.

Paragraph 6. A method according to any of Paragraphs 1 to 5, wherein the at least one bundling characteristic comprises both of a lower limit acknowledgement number, $K_{R-MIN}$, and an upper limit acknowledgement number, $K_{R-MAX}$, and the method comprises determining, for each of at least one of the bundled bits, the bundling operation to be performed based on both a value of $K_{R-MIN}$ and a value of $K_{R-MAX}$ associated with that bundled bit, and wherein each of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is within a range defined by the values of $K_{R-MIN}$ and $K_{R-MAX}$ associated with that bundled bit, or a negative acknowledgement, NACK, if the values of the acknowledgement bits indicate that a number of the downlink transmission occasions within which one of the signals has been successfully received by the communications device on one of the downlink channels is outside of the range defined by the values of $K_{R-MIN}$ and $K_{R-MAX}$ associated with that bundled bit.

Paragraph 7. A method according to Paragraph 6, wherein the number of the downlink transmission occasions within which one of the signals has been successfully received by the communications device on one of the downlink channels is determined to be within the range defined by the values of $K_{R-MIN}$ and $K_{R-MAX}$ if the number of the downlink transmission occasions within which one of the signals has been successfully received by the communications device on one of the downlink channels is either between the values of $K_{R-MIN}$ and $K_{R-MAX}$ or equal to the values of $K_{R-MIN}$ and $K_{R-MAX}$.

Paragraph 8. A method according to Paragraph 6 or Paragraph 7, wherein the number of the downlink transmission occasions within which one of the signals has been successfully received by the communications device on one of the downlink channels is determined to be within the range defined by the values of $K_{R-MIN}$ and $K_{R-MAX}$ if the number of the downlink transmission occasions within which one of the signals has been successfully received by the communications device on one of the downlink channels is between the values of $K_{R-MIN}$ and $K_{R-MAX}$ and not equal to either of the values of $K_{R-MIN}$ or $K_{R-MAX}$.

Paragraph 9. A method according to any of Paragraphs 6 to 8, comprising determining, for one or more of the at least one of the bundled bits, that a subset of more than one of the plurality of different bundling operations can be used to determine whether the number of acknowledgement bits is within the range defined by the values of $K_{R-MIN}$ and $K_{R-MAX}$ associated with the one or more of the at least one of the bundled bits, and selecting, for the one or more of the at least one of the bundled bits, the performed bundling operation from among the subset of different bundling operations.

Paragraph 10. A method according to any of Paragraphs 1 to 9, comprising receiving Radio Resource Control, RRC, signalling from the wireless communications network, wherein the RRC signalling comprises one or more of an indication of the plurality of downlink transmission occasions, an indication of a number of the bundled bits which the communications device is to transmit to the wireless communications network, and, for each of the bundled bits which is to be transmitted, the at least one bundling characteristic.

Paragraph 11. A method according to any of Paragraphs 1 to 10, comprising receiving a dynamic indication from the wireless communications network, and determining, based on the dynamic indication, one or more of the plurality of downlink transmission occasions, a number of the bundled bits which the communications device is to transmit to the wireless communications network, and, for each of the bundled bits which is to be transmitted, the at least one bundling characteristic.

Paragraph 12. A method according to Paragraph 11, comprising receiving, from the wireless communications network, one of an activation downlink control information, DCI, indicating that one or more of the downlink transmission occasions are activated and therefore are used by the communications device for receiving downlink signals from the wireless communications network, and a deactivation DCI indicating that one or more of the downlink transmission occasions are deactivated and therefore are not to be used by the communications device for receiving downlink signals from the wireless communications network, wherein a field of the one of the activation DCI and the deactivation DCI comprises the dynamic indication.

Paragraph 13. A method according to Paragraph 11 or Paragraph 12, wherein the dynamic indication comprises an indication of the plurality of downlink transmission occasions and an indication of one of a plurality of preconfigured bundling operation sets, wherein each of the bundling operation sets defines both the number of the bundled bits which the communications device is to transmit to the wireless communications network, and, for each of the bundled bits which is to be transmitted, the at least one bundling characteristic.

Paragraph 14. A method according to any of Paragraphs 1 to 13, comprising receiving, from the wireless communications network, a Medium Access Control, MAC, Control Element, CE, wherein the MAC CE comprises one or more of an indication of the plurality of downlink transmission occasions, an indication of a number of the bundled bits which the communications device is to transmit to the wireless communications network, and, for each of the bundled bits which is to be transmitted, the at least one bundling characteristic.

Paragraph 15. A method according to any of Paragraphs 1 to 14, wherein the downlink transmission occasions are Semi-Persistent Scheduling, SPS, resource instances forming an SPS group, wherein the SPS resource instances are periodically located in a plurality of downlink resource units of the wireless radio interface.

Paragraph 16. A communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry to receive, from the wireless communications network, signals on one or more downlink channels, each of the downlink channels being within one of a plurality of downlink transmission occasions, to determine, for each of the downlink transmission occasions, a value of an acknowledgement bit indicating whether or not one of the signals has been successfully received by the communications device on one of the downlink channels within that downlink transmission occasion, to perform, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, and to transmit, to the wireless communications network, an indication of the one or more bundled bits.

Paragraph 17. Circuitry for a communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry to receive, from the wireless communications network, signals on one or more downlink channels, each of the downlink channels being within one of a plurality of downlink transmission occasions, to determine, for each of the downlink transmission occasions, a value of an acknowledgement bit indicating whether or not one of the signals has been successfully received by the circuitry on one of the downlink channels within that downlink transmission occasion, to perform, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, and to transmit, to the wireless communications network, an indication of the one or more bundled bits.

Paragraph 18. A method of operating an infrastructure equipment forming part of a wireless communications network configured to transmit signals to and/or to receive signals from a communications device via a wireless radio interface provided by the wireless communications network, the method comprising transmitting, to the communications device, signals on one or more downlink channels, each of the downlink channels being within one of a plurality of downlink transmission occasions, and receiving, from the communications device, an indication of one or more bundled bits produced by one or more bundling operations performed by the communications device, wherein the one or more bundled bits indicate a result of the bundling operations performed on acknowledgement bits determined by the communications device for each of the downlink transmission occasions based on at least one or more bundling characteristic, wherein each of the acknowledgement bits indicates whether or not one of the signals has been successfully received by the communications device on one of the downlink channels within that downlink transmission occasion.

Paragraph 19. A method according to Paragraph 18, wherein the at least one bundling characteristic comprises a minimum acknowledgement number, $K_{MIN}$, and the method comprises transmitting, to the communications device for each of at least one of the bundled bits, an indication of a value of $K_{MIN}$ associated with that bundled bit, and determining that each of the at least one of the bundled bits received from the communications device will indicate either a positive acknowledgement, ACK, if the values of the acknowledgement bits indicate that a number of the downlink transmission occasions within which one of the signals has been successfully received by the communications device on one of the downlink channels is greater than or equal to the value of $K_{MIN}$ associated with that bundled bit, or a negative acknowledgement, NACK, if the values of the acknowledgement bits indicate that a number of the downlink transmission occasions within which one of the signals has been successfully received by the communications device on one of the downlink channels is less than the value of $K_{MIN}$ associated with that bundled bit.

Paragraph 20. A method according to Paragraph 18 or Paragraph 19, wherein the at least one bundling characteristic comprises an exact acknowledgement number, $K_{EXACT}$, and the method comprises transmitting, to the communications device for each of at least one of the bundled bits, an indication of a value of $K_{EXACT}$ associated with that bundled bit, and determining that each of the at least one of the bundled bits received from the communications device will indicate either a positive acknowledgement, ACK, if the values of the acknowledgement bits indicate that a number of the downlink transmission occasions within which one of the signals has been successfully received by the communications device on one of the downlink channels is equal to the value of $K_{EXACT}$ associated with that bundled bit, or a negative acknowledgement, NACK, if the values of the acknowledgement bits indicate that a number of the downlink transmission occasions within which one of the signals has been successfully received by the communications device on one of the downlink channels is not equal to the value of $K_{EXACT}$ associated with that bundled bit.

Paragraph 21. A method according to any of Paragraphs 18 to 20, wherein the at least one bundling characteristic comprises both of a lower limit acknowledgement number, $K_{R-MIN}$, and an upper limit acknowledgement number, $K_{R-MAX}$, and the method comprises transmitting, to the communications device for each of at least one of the bundled bits, a value of $K_{R-MIN}$ and a value of $K_{R-MAX}$ associated with that bundled bit associated with that bundled bit, and determining that each of the at least one of the bundled bits received from the communications device will indicate either a positive acknowledgement, ACK, if the values of the acknowledgement bits indicate that a number of the downlink transmission occasions within which one of the signals has been successfully received by the communications device on one of the downlink channels is within a range defined by the values of $K_{R-MIN}$ and $K_{R-MAX}$ associated with that bundled bit, or a negative acknowledgement, NACK, if the values of the acknowledgement bits indicate that a number of the downlink transmission occasions within which one of the signals has been successfully received by the communications device on one of the downlink channels is outside of the range defined by the values of $K_{R-MIN}$ and $K_{R-MAX}$ associated with that bundled bit.

Paragraph 22. A method according to any of Paragraphs 18 to 21, comprising transmitting Radio Resource Control, RRC, signalling to the communications device, wherein the RRC signalling comprises one or more of an indication of the plurality of downlink transmission occasions, an indication of a number of the bundled bits which the communications device is to transmit to the infrastructure equipment, and, for each of the bundled bits which is to be transmitted, the at least one bundling characteristic.

Paragraph 23. A method according to any of Paragraphs 18 to 22, comprising transmitting a dynamic indication to the communications device, wherein the dynamic indication indicates one or more of the plurality of downlink transmission occasions, a number of the bundled bits which the communications device is to transmit to the infrastructure equipment, and, for each of the bundled bits which is to be transmitted, the at least one bundling characteristic.

Paragraph 24. A method according to Paragraph 23, comprising transmitting, to the communications device, one of an activation downlink control information, DCI, indicating that one or more of the downlink transmission occasions are activated and therefore are used by the communications device for receiving downlink signals from the infrastructure equipment, and a deactivation DCI indicating that one or more of the downlink transmission occasions are deactivated and therefore are not used by the communications device for receiving downlink signals from the infrastructure equipment, wherein a field of the one of the activation DCI and the deactivation DCI comprises the dynamic indication.

Paragraph 25. A method according to Paragraph 23 or Paragraph 24, wherein the dynamic indication comprises an indication of the plurality of downlink transmission occasions and an indication of one of a plurality of preconfigured bundling operation sets, wherein each of the bundling operation sets defines both the number of the bundled bits which the communications device is to transmit to the infrastructure equipment, and, for each of the bundled bits which is to be transmitted, the at least one bundling characteristic.

Paragraph 26. A method according to any of Paragraphs 18 to 25, comprising transmitting, to the communications device, a Medium Access Control, MAC, Control Element, CE, wherein the MAC CE comprises one or more of an indication of the plurality of downlink transmission occasions, an indication of a number of the bundled bits which the communications device is to transmit to the infrastructure equipment, and, for each of the bundled bits which is to be transmitted, the at least one bundling characteristic.

Paragraph 27. A method according to any of Paragraphs 18 to 26, wherein the downlink transmission occasions are Semi-Persistent Scheduling, SPS, resource instances forming an SPS group, wherein the SPS resource instances are periodically located in a plurality of downlink resource units of the wireless radio interface.

Paragraph 28. An infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry to transmit, to the communications device, signals on one or more downlink channels, each of the downlink channels being within one of a plurality of downlink transmission occasions, and to receive, from the communications device, an indication of one or more bundled bits produced by one or more bundling operations performed by the communications device, wherein the one or more bundled bits indicate a result of the bundling operations performed on acknowledgement bits determined by the communications device for each of the downlink transmission occasions based on at least one or more bundling characteristic, wherein each of the acknowledgement bits indicates whether or not one of the signals has been successfully received by the communications device on one of the downlink channels within that downlink transmission occasion.

Paragraph 29. Circuitry for an infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry to transmit, to the communications device, signals on one or more downlink channels, each of the downlink channels being within one of a plurality of downlink transmission occasions, and to receive, from the communications device, an indication of one or more bundled bits produced by one or more bundling operations performed by the communications device, wherein the one or more bundled bits indicate a result of the bundling operations performed on acknowledgement bits determined by the communications device for each of the downlink transmission occasions based on at least one or more bundling characteristic, wherein each of the acknowledgement bits indicates whether or not one of the signals has been successfully received by the communications device on one of the downlink channels within that downlink transmission occasion.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] TR 38.913, "Study on Scenarios and Requirements for Next Generation Access Technologies (Release 14)", third Generation Partnership Project, v14.3.0.

[3] RP-190726, "Physical layer enhancements for NR ultra-reliable and low latency communication (URLLC)", Huawei, HiSilicon, RAN #83.

[4] RP-201310, "Revised WID: Enhanced Industrial Internet of Things (IoT) and ultra-reliable and low latency communication (URLLC) support for NR," Nokia, Nokia Shanghai Bell, RAN #88e.

[5] R1-210818, "Moderator summary #2 on HARQ-ACK feedback enhancements for NR Rel-17 URLLC/IIoT," Moderator (Nokia), RAN1 #104e.

[6] R1-2008984, "Discussion on prioritized UE HARQ feedback enhancements for URLLC/IIoT," Intel Corporation, RAN WG1 #103-e.

[7] European patent application number EP20201191.2.

What is claimed is:

1. A method of operating a communications device configured to transmit signals to and/or to receive signals from a wireless communications network via a wireless radio interface provided by the wireless communications network, the method comprising receiving, from the wireless communications network, signals on one or more downlink channels, each of the downlink channels being within one of a plurality of downlink transmission occasions, determining, for each of the downlink transmission occasions, a value of an acknowledgement bit indicating whether or not one of the signals has been successfully received by the communications device on one of the downlink channels within that downlink transmission occasion, performing, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, wherein the at least one bundling characteristic comprises a minimum acknowledgement number, $K_{MIN}$, determining, for each of at least one of the bundled bits, the bundling operation to be performed based on a value of $K_{MIN}$ associated with that bundled bit, wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is greater than or equal to the value of $K_{MIN}$ associated with that bundled bit, or a negative acknowledgement, NACK, if the values of the acknowledgement bits indicate that a number of the downlink transmission occasions within which one of the signals has been successfully received by the communications device on one of the downlink channels is less than the value of $K_{MIN}$ associated with that bundled bit, and transmitting, to the wireless communications network, an indication of the one or more bundled bits.

2. A method according to claim 1, comprising determining, for one or more of the at least one of the bundled bits, that a subset of more than one of the plurality of different bundling operations can be used to determine whether the number of acknowledgement bits is either greater than or equal to the value of $K_{MIN}$ associated with the one or more of the at least one of the bundled bits or less than the value of $K_{MIN}$ associated with the one or more of the at least one of the bundled bits, and selecting, for the one or more of the at least one of the bundled bits, the performed bundling operation from among the subset of different bundling operations.

3. A method according to claim 1, wherein the at least one bundling characteristic comprises an exact acknowledgement number, $K_{EXACT}$, and the method comprises determining, for each of at least one of the bundled bits, the bundling operation to be performed based on a value of $K_{EXACT}$ associated with that bundled bit, and wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is equal to the value of $K_{EXACT}$ associated with that bundled bit, or a negative acknowledgement, NACK, if the values of the acknowledgement bits indicate that a number of the downlink transmission occasions within which one of the signals has been successfully received by the communications device on one of the downlink channels is not equal to the value of $K_{EXACT}$ associated with that bundled bit.

4. A method according to claim 3, comprising determining, for one or more of the at least one of the bundled bits, that a subset of more than one of the plurality of different bundling operations can be used to determine whether the number of acknowledgement bits is either equal to the value of $K_{EXACT}$ associated with the one or more of the at least one of the bundled bits or not equal to the value of $K_{EXACT}$ associated with the one or more of the at least one of the bundled bits, and selecting, for the one or more of the at least one of the bundled bits, the performed bundling operation from among the subset of different bundling operations.

5. A method according to claim 1, wherein the at least one bundling characteristic comprises both of a lower limit acknowledgement number, $K_{R\text{-}MIN}$, and an upper limit acknowledgement number, $K_{R\text{-}MAX}$, and the method comprises determining, for each of at least one of the bundled bits, the bundling operation to be performed based on both a value of $K_{R\text{-}MIN}$ and a value of $K_{R\text{-}MAX}$ associated with that bundled bit, and wherein each of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is within a range defined by the values of $K_{R\text{-}MIN}$ and $K_{R\text{-}MAX}$ associated with that bundled bit, or a negative acknowledgement, NACK, if the values of the acknowledgement bits indicate that a number of the downlink transmission occasions within which one of the signals has been successfully received by the communications device on one of the downlink channels is outside of the range defined by the values of $K_{R\text{-}MIN}$ and $K_{R\text{-}MAX}$ associated with that bundled bit.

6. A method according to claim 5, wherein the number of the downlink transmission occasions within which one of the signals has been successfully received by the communications device on one of the downlink channels is determined to be within the range defined by the values of $K_{R\text{-}MIN}$ and $K_{R\text{-}MAX}$ if the number of the downlink transmission occasions within which one of the signals has been successfully received by the communications device on one of the downlink channels is either between the values of $K_{R\text{-}MIN}$ and $K_{R\text{-}MAX}$ Or equal to the values of $K_{R\text{-}MIN}$ and $K_{R\text{-}MAX}$.

7. A method according to claim 5, wherein the number of the downlink transmission occasions within which one of the signals has been successfully received by the communications device on one of the downlink channels is determined to be within the range defined by the values of $K_{R\text{-}MIN}$ and $K_{R\text{-}MAX}$ if the number of the downlink transmission occasions within which one of the signals has been successfully received by the communications device on one of the downlink channels is between the values of $K_{R\text{-}MIN}$ and $K_{R\text{-}MAX}$ and not equal to either of the values of $K_{R\text{-}MIN}$ OF $K_{R\text{-}MAX}$.

8. A method according to claim 5, comprising determining, for one or more of the at least one of the bundled bits, that a subset of more than one of the plurality of different bundling operations can be used to determine whether the number of acknowledgement bits is within the range defined by the values of $K_{R\text{-}MIN}$ and $K_{R\text{-}MAX}$ associated with the one or more of the at least one of the bundled bits, and selecting, for the one or more of the at least one of the bundled bits, the performed bundling operation from among the subset of different bundling operations.

9. A method according to claim 1, comprising receiving Radio Resource Control, RRC, signalling from the wireless communications network, wherein the RRC signalling comprises one or more of an indication of the plurality of downlink transmission occasions, an indication of a number of the bundled bits which the communications device is to transmit to the wireless communications network, and, for each of the bundled bits which is to be transmitted, the at least one bundling characteristic.

10. A method according to claim 1, comprising receiving a dynamic indication from the wireless communications network, and determining, based on the dynamic indication, one or more of the plurality of downlink transmission occasions, a number of the bundled bits which the communications device is to transmit to the wireless communications network, and, for each of the bundled bits which is to be transmitted, the at least one bundling characteristic.

11. A method according to claim 10, comprising receiving, from the wireless communications network, one of an activation downlink control information, DCI, indicating that one or more of the downlink transmission occasions are activated and therefore are used by the communications device for receiving downlink signals from the wireless communications network, and a deactivation DCI indicating that one or more of the downlink transmission occasions are deactivated and therefore are not to be used by the communications device for receiving downlink signals from the wireless communications network, wherein a field of the one of the activation DCI and the deactivation DCI comprises the dynamic indication.

12. A method according to claim 10, wherein the dynamic indication comprises an indication of the plurality of downlink transmission occasions and an indication of one of a plurality of preconfigured bundling operation sets, wherein each of the bundling operation sets defines both the number of the bundled bits which the communications device is to transmit to the wireless communications network, and, for each of the bundled bits which is to be transmitted, the at least one bundling characteristic.

13. A method according to claim 1, comprising receiving, from the wireless communications network, a Medium Access Control, MAC, Control Element, CE, wherein the MAC CE comprises one or more of an indication of the plurality of downlink transmission occasions, an indication of a number of the bundled bits which the communications device is to transmit to the wireless communications network, and, for each of the bundled bits which is to be transmitted, the at least one bundling characteristic.

14. A method according to claim 1, wherein the downlink transmission occasions are Semi-Persistent Scheduling, SPS, resource instances forming an SPS group, wherein the SPS resource instances are periodically located in a plurality of downlink resource units of the wireless radio interface.

15. A communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry to receive, from the wireless communications network, signals on one or more downlink channels, each of the downlink channels being within one of a plurality of downlink transmission occasions, to determine, for each of the downlink transmission occasions, a value of an acknowledgement bit indicating whether or not one of the signals has been successfully received by the communications device on one of the downlink channels within that downlink transmission occasion, to perform, based on at least one bundling characteristic, one or more of a plurality of different bundling operations on the acknowledgement bits determined for each of the downlink transmission occasions to produce one or more bundled bits, wherein each of the bundled bits is produced by one or more of the performed bundling operations, wherein the at least one bundling characteristic comprises a minimum acknowledgement number, $K_{MIN}$, to determine, for each of at least one of the bundled bits, the bundling operation to be performed based on a value of Kw associated with that bundled bit, wherein each of the at least one of the bundled bits produced by the determined bundling operation to be performed is to indicate either a positive acknowledgement, ACK, if the values of the acknowledgement bits indicate that a number of the downlink transmission occasions within which one of the signals has been successfully received by the communications device on one of the downlink channels is greater than or equal to the value of $K_{MIN}$ associated with that bundled bit, or a negative acknowledgement, NACK, if the values of the acknowledgement bits indicate that a number of the downlink transmission occasions within which one of the signals has been successfully received by the communications device on one of the downlink channels is less than the value of $K_{MIN}$ associated with that bundled bit, and to transmit, to the wireless communications network, an indication of the one or more bundled bits.

16. An infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry to transmit, to the communications device, signals on one or more downlink channels, each of the downlink channels being within one of a plurality of downlink transmission occasions, and to receive, from the communications device, an indication of one or more bundled bits produced by one or more bundling operations performed by the communications device, wherein the one or more bundled bits indicate a result of the bundling operations performed on acknowledgement bits determined by the communications device for each of the downlink transmission occasions based on at least one or more bundling characteristic, wherein each of the acknowledgement bits indicates whether or not one of the signals has been successfully received by the communications device on one of the downlink channels within that downlink transmission occasion, wherein the at least one bundling characteristic comprises a minimum acknowledgement number, $K_{MIN}$, wherein each of the at least one of the bundled bits produced by a bundling operation determined based on a value of $K_{MIN}$ associated with that bundled bit is to indicate either a positive acknowledgement, ACK, if the values of the acknowledgement bits indicate that a number of the downlink transmission occasions within which one of the signals has been successfully received by the communications device on one of the downlink channels is greater than or equal to the value of $K_{MIN}$ associated with that bundled bit, or a negative acknowledgement, NACK, if the values of the acknowledgement bits indicate that a number of the downlink transmission occasions within which one of the signals has been successfully received by the communications device on one of the downlink channels is less than the value of Kun associated with that bundled bit.

17. A communications device according to claim 15, wherein the downlink transmission occasions are Semi-Persistent Scheduling (SPS) resource instances forming an SPS group, wherein the SPS resource instances are periodically located in a plurality of downlink resource units of the wireless radio interface.

* * * * *